(12) United States Patent
Tian et al.

(10) Patent No.: US 9,044,841 B2
(45) Date of Patent: Jun. 2, 2015

(54) ABRASIVE ARTICLES AND METHODS OF FORMING

(75) Inventors: Yinggang Tian, Shrewsbury, MA (US);
Krishnamoorthy Subramanian, Lexington, MA (US)

(73) Assignees: Saint-Gobain Abrasives, Inc., Worcester, MA (US); Saint-Gobain Abrasifs, Conflans-Sainte-Honorine (FR)

( * ) Notice: Subject to any disclaimer, the term of this patent is extended or adjusted under 35 U.S.C. 154(b) by 779 days.

(21) Appl. No.: 13/130,749

(22) PCT Filed: Nov. 19, 2009

(86) PCT No.: PCT/US2009/065160
§ 371 (c)(1),
(2), (4) Date: Nov. 9, 2011

(87) PCT Pub. No.: WO2010/059835
PCT Pub. Date: May 27, 2010

(65) Prior Publication Data
US 2012/0055097 A1    Mar. 8, 2012

Related U.S. Application Data

(60) Provisional application No. 61/199,662, filed on Nov. 19, 2008, provisional application No. 61/199,713, filed on Nov. 19, 2008, provisional application No. 61/199,709, filed on Nov. 19, 2008.

(51) Int. Cl.
*B24D 3/00* (2006.01)
*B24D 11/00* (2006.01)
(Continued)

(52) U.S. Cl.
CPC ............. *B24D 3/06* (2013.01); *B23K 1/0056* (2013.01); *B23K 26/3206* (2013.01);
(Continued)

(58) Field of Classification Search
USPC ........................................... 51/309, 293, 307
See application file for complete search history.

(56) References Cited

U.S. PATENT DOCUMENTS 4,689,919 A   9/1987   Kawakita
5,366,522 A * 11/1994   Nakamura et al. .............. 51/293
(Continued)

FOREIGN PATENT DOCUMENTS

CN   1513639 A   7/2004
CN   102271866 A   12/2011
(Continued)

OTHER PUBLICATIONS

International Search Report from PCT/US2009/065160, dated Jul. 5, 2012, 1 pg.
(Continued)

*Primary Examiner* — James McDonough
(74) *Attorney, Agent, or Firm* — Joseph P. Sullivan; Abel Law Group, LLP

(57) ABSTRACT

A method of forming an abrasive article includes directing a beam of electromagnetic radiation at a starting location on an abrasive preform comprising a bonding layer and abrasive grains within the bonding layer, and increasing the power of the beam of electromagnetic radiation to a scanning power while directed at the starting location. The method further includes changing the position of the beam relative to the abrasive preform from the starting location to a second location on the abrasive preform.

19 Claims, 29 Drawing Sheets

(51) Int. Cl.
  *B24D 18/00* (2006.01)
  *C09K 3/14* (2006.01)
  *B24D 3/02* (2006.01)
  *C09C 1/68* (2006.01)
  *B24D 3/06* (2006.01)
  *B23K 1/005* (2006.01)
  *B23K 26/32* (2014.01)
  *B23K 26/34* (2014.01)

(52) U.S. Cl.
  CPC .......... *B23K 26/3213* (2013.01); *B23K 26/322* (2013.01); *B23K 26/3226* (2013.01); *B23K 26/34* (2013.01); *B23K 2203/02* (2013.01); *B23K 2203/10* (2013.01); *B23K 2203/12* (2013.01); *B23K 2203/14* (2013.01); *B23K 2203/18* (2013.01); *B24D 11/001* (2013.01)

(56) References Cited

U.S. PATENT DOCUMENTS

| | | | | |
|---|---|---|---|---|
| 5,669,943 | A * | 9/1997 | Horton et al. | 51/307 |
| 6,316,065 | B1 * | 11/2001 | Wallmann | 427/596 |
| 2005/0022457 | A1 | 2/2005 | Chen | |
| 2005/0025894 | A1 | 2/2005 | Ren et al. | |
| 2007/0071907 | A1 * | 3/2007 | Stiles et al. | 427/554 |

FOREIGN PATENT DOCUMENTS

| | | |
|---|---|---|
| EP | 2382067 | 11/2011 |
| JP | 3260764 | 12/2001 |
| JP | 3260764 B2 | 2/2002 |

OTHER PUBLICATIONS

Laser Brazing of Diamond Grits with a Ni-based Brazing Alloy, Yan et al., Key Engineering Materials, vols. 359-360 (2008) pp. 43-47 and "High Powered CO2 Laser Brazing of Diamond Grits, Yang et al., Chinese Journal of Lasers", Apr. 2007, vol. 34, No. 4.

High Powered CO2 Laser Brazing of Diamond Grits, Yang et al., Chinese Journal of Lasers, Apr. 2007, vol. 34, No. 4.

A. Lang et al., "Near net shape manufacturing of diamond containing metal matrix composites by Laser cladding," Materialwissenschaft and Werkstofftechnik (Mater.wissen. Werkst.tech.) vol. 27, No. 5, pp. 215-226 (1996).

A. Lang et al., "Cladding of Metallic Substrates with Diamonds and Cubic Boron Nitride," Proc. ECLAT '94 (European Conference on Laser Treatment of Materials), pp. 456-461 (1994).

C. Wallmann et al., "Alternative Production of Diamond Tools by Laser Cladding," Proc. 3rd European Conf. on Hard Materials Production, 8-10th (1999).

Z. Yang et al, "Microstructure of laser brazed diamond grits," Materials for Mechanical Engineering (China), vol. 32, No. 5, pp. 17-19, (May 2007).

Z. Yang, "Laser brazing of diamond grits with a Ni-based brazing alloy," Key Engineering Materials, vol. 359-360, pp. 43-47, (2008).

\* cited by examiner

ABRASIVE ARTICLES AND METHODS OF FORMING

CROSS-REFERENCE TO RELATED APPLICATION(S)

The present application claims priority from PCT Application No. PCT/US09/65160, filed Nov. 19, 2009, entitled "BONDED ABRASIVE ARTICLE AND METHOD OF FORMING," naming inventors Yinggang Tian and Krishnamoorthy Subramanian, which in turn claims priority to U.S. Provisional Application Nos. 61/199,662, 61/199,713 and 61/199,709, all filed Nov. 19, 2008, entitled "BONDED ABRASIVE ARTICLE AND METHOD OF FORMING," "BONDED ABRASIVE ARTICLE AND METHOD OF FORMING," and "BRAZED ABRASIVE ARTICLES AND METHODS OF FORMING," respectively, and all naming inventors Yinggang Tian and Krishnamoorthy Subramanian, which applications are all incorporated by reference herein in their entirety.

TECHNICAL FIELD

The following is directed to abrasive articles, and more particularly brazed abrasive articles formed using a beam of electromagnetic energy.

BACKGROUND ART

Abrasive articles come in a variety of shapes and sizes to accommodate various abrasive applications. Such articles can generally be separated into two categories, bonded abrasive tools and coated abrasive tools. Bonded abrasive tools consist of rigid, and typically monolithic, three-dimensional, abrasive composites in the form of wheels, discs, and other tool shapes, having three structural elements or phases: abrasive grain, bond, and porosity. Coated abrasive articles typically consist of two-dimensional abrasive composites, having a substrate, a bonding layer and a single layer of abrasive grains contained within the bonding layer, the most common example being sand paper.

With respect to certain coated abrasive articles, some tools utilize metal-containing bonding material to affix abrasive grains to the substrate and are referred to as brazed abrasive products, which include superabrasive products such as metal-bonded diamond, diamond-like carbonaceous, and cubic boron nitride-based products having exceptional abrasive properties. Various techniques exist for forming the metal bonding layers, such as electroplating, which involves depositing a metal bonding layer on a substrate using electrical current. Abrasive grains can also be deposited while applying the metal bonding layer. Electroplating is limited in that not all abrasive particles form adequate bonds with electro-deposited metals, and is further limited since not all metals are capable of electrodeposition. Another method of forming brazed abrasive articles is by sintering the metal bonded layer, wherein the substrate, bonding layer, and abrasive grains are exposed to a temperature sufficient to melt the bonding material and secure the abrasive grains to the substrate. Sintering processes are generally long and expend substantial amounts of energy thus limiting processing efficiency, and may also result in non-uniformity of the brazed layer due to thermal variations within the furnace. Additionally, formation of unwanted interfacial substances due to high temperature diffusion mechanics may occur between the components after extended durations.

Accordingly, it would be suitable to develop abrasive tools having improved characteristics and improved methods of forming such abrasive tools.

DISCLOSURE OF INVENTION

According to a first aspect, a method for conducting a brazing process includes providing a substrate having an abrasive region comprising a bonding layer and abrasive grains contained within the bonding layer and changing a position of a beam of electromagnetic radiation relative to the abrasive region from a first location to a second location at a brazing area rate to form a brazed abrasive region on the substrate. The maximum brazing area rate $Vr_{max}$ (mm²/s) is dependent upon the heat flux rate (qr) of the beam of electromagnetic radiation and the absorptivity (a) of the bonding layer material relative to a wavelength of the electromagnetic radiation.

According to another aspect, a method for conducting a brazing process includes providing a substrate having a single-layered abrasive region comprising a bonding layer and a single layer of abrasive grains contained within the bonding layer, and changing a position of a beam of electromagnetic radiation relative to the abrasive region from a first location to a second location at a brazing area rate to form a brazed abrasive region on the substrate. The brazing area rate, Vr (mm²/s) is determined based on the formula $0.0006(qr)^2 - 0.05(qr) + 1.5 \leq Vr \leq 0.0009(qr)^2 - 0.06(qr) + 1.5$, wherein qr is the heat flux rate of the beam of electromagnetic radiation, which is further dependent upon the absorptivity (a) of the bonding layer material relative to a wavelength of the electromagnetic radiation.

In another aspect, a method for conducting a brazing process includes providing a substrate having an abrasive region comprising a bonding layer and abrasive grains contained within the bonding layer, wherein the bonding layer comprises metal grains contained within a binder and the binder has a porosity of at least about 20 vol %. The method further includes determining a heat flux rate (qr), wherein $qr=(q/r)*(\alpha)$, wherein q is the power density of the beam in W/mm², r is the radius of the beam, and ($\alpha$) is the absorptivity of the bonding layer, and determining a maximum brazing rate based upon the heat flux rate, wherein the maximum brazing area rate, $Vr_{max}$ (mm²/s) is not greater than a value based on the formula, $Vr_{max} = 0.0009(qr)^2 - 0.06(qr) + 1.5$ for a heat flux rate (qr) of at least about 40 W/mm. The method further includes forming a brazed abrasive region by changing a position of a beam of electromagnetic radiation relative to the abrasive region from a first location to a second location at the brazing rate.

According to a first aspect a method of forming an abrasive article includes directing a beam of electromagnetic radiation at a starting location on an abrasive preform having a bonding layer and abrasive grains within the bonding layer, and increasing the power of the beam of electromagnetic radiation to a scanning power while directed at the starting location. The method further includes changing the position of the beam relative to the abrasive preform from the starting location to a second location on the abrasive preform.

According to another aspect, a method of forming an abrasive article includes forming an abrasive preform comprising the steps of providing a substrate, forming a bonding layer over a portion of the substrate, and placing a single layer of abrasive grains within the bonding layer. The method further includes directing a beam of electromagnetic radiation at a portion of the abrasive preform to heat the abrasive preform and form a single-layered abrasive article, wherein the beam defines a radiation zone having a rectangular shape.

In a third aspect, a method of forming an abrasive article includes providing an abrasive preform comprising a substrate, a bonding layer overlying a surface of the substrate, and a single layer of abrasive grains bonded within the bonding layer, and brazing a portion of the abrasive preform using a beam of electromagnetic radiation to form a brazed single-layered abrasive tool. The beam of electromagnetic radiation defines a radiation zone having a rectangular shape and the radiation zone is incident upon a portion of the abrasive preform defining an impingement area, and wherein the radiation zone has an area greater than the impingement area.

In accordance with another aspect, a method of forming an abrasive article includes providing an abrasive preform comprising a substrate, a bonding layer overlying a surface of the substrate, and a single layer of abrasive grains bonded within the bonding layer, and scanning a beam of electromagnetic radiation across portions of the abrasive preform comprising the boding layer and abrasive grains to form a brazed single-layered abrasive tool. The beam of electromagnetic radiation has a power of at least about 800 W, and defines a radiation zone having a rectangular shape, wherein the radiation zone has an substantially uniform energy distribution across the radiation zone.

According to another aspect, an abrasive article includes a substrate, a bonding layer overlying the substrate, and a diffusion layer between the substrate and the bonding layer, the diffusion layer having an average thickness of not greater than about 7 microns. The article also includes a plurality of abrasive grains arranged in a single layer within the bonding layer, wherein the abrasive grains are uniformly dispersed over an entire area of the bonding layer In another aspect, an abrasive article includes a substrate, a bonding layer overlying the substrate defining an abrasive region, wherein the bonding layer comprises an average Vickers hardness greater than about 700 HV and a bond strength as measured by an average grain retention value of at least 8.5 lbs under a maximum test force of 10 lbs. The abrasive article also includes a plurality of abrasive grains arranged in a single layer and contained within the bonding layer.

According to a first aspect, a method of forming an abrasive article includes directing a beam of electromagnetic radiation at a starting location on a non-abrasive region of a substrate adjacent to and spaced apart from an abrasive region including abrasive grains contained within a bonding layer, and holding the beam at the starting location for a pre-heating duration. The method further includes changing the position of the beam relative to the abrasive region to impinge the beam on the abrasive portion and braze the bonding layer.

In a second aspect, a method of forming an abrasive article includes forming a single-layered abrasive preform made by providing a substrate, forming a bonding layer overlying a surface of the substrate, placing a single layer of abrasive grains within the bonding layer. The method further includes directing a beam of electromagnetic energy having a power of not greater than about 700 W at a portion of the single-layered abrasive preform comprising the abrasive grains and bonding layer to form a single-layered abrasive article.

According to another aspect, a method of forming an abrasive article includes providing a single-layered abrasive preform comprising an abrasive region having a bonding layer overlying a surface of a substrate, and a single layer of abrasive grains contained within the bonding layer, and directing a beam of electromagnetic radiation at a portion of the abrasive region. In particular, the beam has a power of less than about 700 W and defines a radiation zone having an energy uniformity within the radiation zone that is substantially uniform.

In accordance with another aspect, a method of forming an abrasive article includes brazing an abrasive region comprising abrasive grains contained within a bonding layer overlying a surface of a substrate by directing a beam of electromagnetic radiation at a non-abrasive starting location abutting the abrasive region, and scanning the beam over the abrasive region at a rate of less than about 5 mm/sec.

In another aspect, a method of forming an abrasive article includes directing a beam of electromagnetic energy at an abrasive region comprising abrasive grains contained within a bonding material overlying a surface of a flexible substrate, and forming the flexible substrate to fit a tool.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DESCRIPTION OF THE PREFERRED EMBODIMENT(S)

The embodiments herein are directed to methods of forming single-layered abrasive products using a beam of electromagnetic radiation as a thermal source for conducting the brazing operation. In particular, the method is directed to determining a suitable brazing rate for conducting a brazing operation using the beam of electromagnetic radiation.

Figure 1:
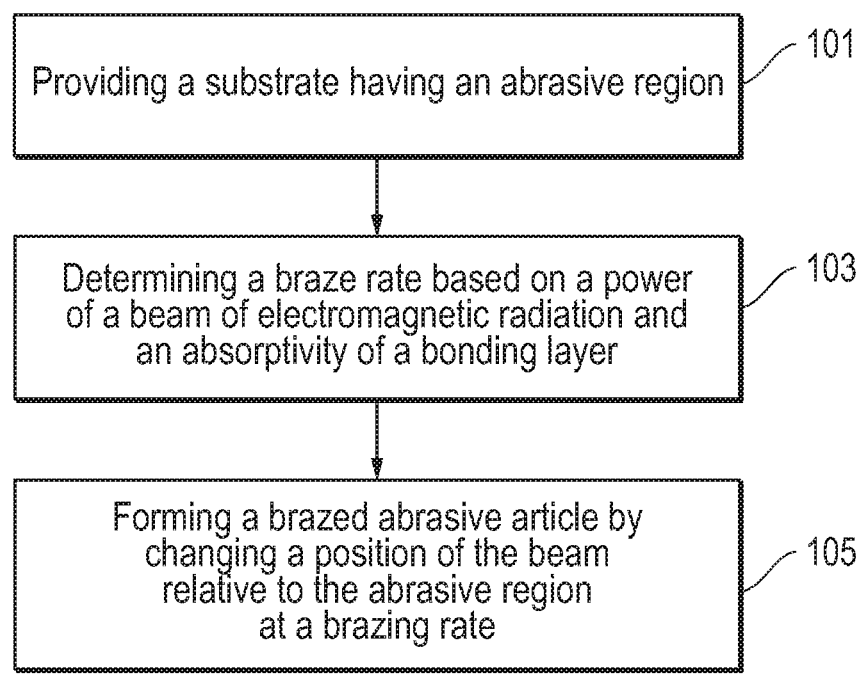
FIG. 1 includes a flowchart illustrating a method of forming a brazed abrasive article in accordance with an embodiment.

FIG. 1 includes a flowchart illustrating a method of forming a brazed abrasive article in accordance with an embodiment. As illustrated, the process is initiated at step 101 by providing a substrate having an abrasive region. The substrate can be a body suitable for containing the abrasive region and can have a variety of shapes depending upon the intended application of the final formed brazed abrasive article. For example, common polygonal shapes such as circular or rectangular, or an annulus.

The substrate can include a metal or metal alloy material. For example, suitable metals can include aluminum, nickel, titanium, chromium, tin, copper, molybdenum, zinc, iron, and a combination thereof. In one particular embodiment, the substrate material is steel, such as low carbon stainless steel. In another embodiment, the substrate is made of a nickel-containing metal, such as Inconel™.

Depending upon the intended application, the substrate can have a thickness such that it is a flexible material, and accordingly has a thickness within a range between about 0.5 mm and about 5 mm. In other instances, the substrate can be a substantially rigid member having a greater thickness, such as on the order of at least about 5 mm, at least about 10 mm, 12 mm, 15 mm, or even at least about 20 mm. Particular embodiments utilize substrates having an average thickness within a range between about 5 mm and about 25 mm.

The abrasive region can be placed on a variety of locations on the substrate. In particular, it is common for the abrasive region to be formed on a major surface of the substrate depending upon the desired application. Different single-layered abrasive articles formed according to the methods herein are illustrated and described in accompanying embodiments. In accordance with one embodiment, the process of providing a substrate having an abrasive region can include forming an abrasive region on a surface of the substrate. In such embodiments, the process of forming the abrasive region can be initiated by forming a bonding layer that can be applied to the surface of the substrate, and placement of abrasive grains within the bonding layer. Formation of the bonding layer can include application of a thin layer of bonding material to a select surface of the substrate. Some suitable methods of forming the bonding material can include application of a paste or tape containing the bonding layer material to a select surface of the substrate.

The bonding layer material can be formed from a mixture of components. In particular, the process of forming can include mixing metal grains with a binder to form the bonding layer material. The metal grains can include metal materials such as nickel, chromium, tin, copper, titanium, molybdenum, aluminum, and a combination thereof. In one particular embodiment, the bonding layer includes metal grains including an alloy of nickel and chrome. According to an alternative embodiment, the bonding layer includes metal grains containing copper.

The metal grains are generally micron sized such that they are suitable for use with the brazing operation using the beam of electromagnetic radiation. As such, the metal grains have an average grain size of not greater than about 30 microns. Certain embodiments use smaller grains, such that the average grain size is not greater than about 20 microns, not greater than about 15 microns, or not greater than about 10 microns. Particular embodiments use metal grains having an average grain size within a range between about 1 micron and 20 microns.

The metal grains may be mixed with a binder material to form the bonding layer mixture that is applied to a surface of the substrate. It is particularly useful to utilize certain percentages of binder and metal grains such that the mixture has the proper characteristics for application to the substrate and is suitable for brazing via a beam of electromagnetic radiation. As such, the mixture forming the bonding layer generally includes at least about 10 wt % binder with the metal grains. In other embodiments, more binder material, may be used such that the mixture includes at least about 20 wt % or at least about 25 wt %. Particular embodiments, utilize an amount of binder not greater than about 40 wt % to form the bonding layer material.

The binder material can include a organic or inorganic materials, and in certain instances the binder is made entirely of inorganic materials to reduce the content of organic materials within the bonding layer. Certain suitable binder materials can include metals and ceramics. For example, in one embodiment, the binder is a Vitta Braz-Binder Gel from Vitta Corporation.

In accordance with a particular embodiment, the binder material includes a certain percentage of porosity, such that it is suitable for use with the brazing operation using a particular beam of electromagnetic radiation. That is, the porosity of the binder material, and ultimately the porosity of the bonding layer, can be controlled, such that it has a suitable absorptivity for use with certain wavelengths of electromagnetic radiation. As such, the bonding layer is formed such that it has a percentage of porosity within the binder of at least 20 vol %. In other embodiments, this porosity may be greater, such as at least about 30 vol %, at least about 40 vol %, or even at least about 50 vol %. In particular instances, the porosity is within a range between about 30 vol % and 80 vol %, and more particularly, within a range between about 45 vol % and about 65 vol %. The porosity of the bonding layer is measured using an indirect method by measuring the thickness of the bonding layer before and after the brazing operation.

The bonding layer generally contains minor amounts of organic materials to avoid volatilization of gaseous species during the brazing process and for control of the absorptivity of the bonding layer with respect to the wavelength of the electromagnetic radiation. Organic materials refer to natural or synthetic organic materials including polymers. In accordance with one embodiment, the bonding layer contains not greater than about 5 wt % of organic material. Other bonding materials may contain less organic material, such as not greater than about 3 wt % or even not greater than about 1 wt %.

The bonding layer also may contain minor amounts of other species that may volatilize during the brazing process, which can result in the formation of a poor braze. For example, the bonding layer generally includes minor amounts of oxygen, nitrogen, and hydrogen. In certain embodiments, such species are present in amounts of not greater than about 5 wt %, not greater than about 3 wt % or not greater than about 1 wt %. Such amounts account for the presence of such species as individual elements or combined with other elements (i.e., chemical compounds).

The bonding layer is formed such that it can have a particular absorptivity (a) with respect to the wavelength of the beam of electromagnetic radiation. In particular, factors such as the porosity, presence of organic components, and surface features upon application to the substrate may be manipulated to form a bonding layer having a particular absorptivity. Control of the absorptivity can facilitate determining a proper brazing rate and thus formation of a suitable brazed abrasive article. According to one embodiment, the absorptivity (a) of the bonding layer is at least about 0.2, such as at least about 0.25, at least about 0.3, at least about 0.35, at least about 0.4, or even at least about 0.5 with respect to the wavelength of the beam of electromagnetic radiation. Particular embodiments utilize an absorptivity (a) of the bonding layer within a range between about 0.3 and about 0.9, and more particularly within a range between about 0.4 and about 0.9 with respect to the wavelength of the beam of electromagnetic radiation.

After forming the mixture of metal grains and binder to form the bonding layer material, the bonding layer material can be applied to a select surface of the substrate. Application of the bonding layer to the substrate can include typical methods such as printing or pasting the bonding layer material to the desired surface of the substrate. Prior to application of the bonding layer to a surface of the substrate, the surfaces of the substrate can be cleaned to remove organic materials that may alter the absorptivity of the substrate material with regard to the beam of electromagnetic radiation. And in fact, such organics can change the wetting behavior of the bonding layer material on the substrate which can also affect the absorptivity of the bonding layer. Cleaning of the substrate can include use of surfactants, deionised water rinses and the like.

The bonding layer is generally thin, such that it is sufficient to bond a single layer of abrasive grains therein. In accordance with an embodiment, the average thickness of the bonding layer is not greater than about 75% of the average grain size of the abrasive grains used. Other embodiments may use a thinner bonding layer, for example, not greater than about 60%, not greater than about 50%, not greater than about 40% or even not greater than about 30% of the average grain size. In one particular embodiment, the bonding layer has an average thickness within a range between about 30% and 75% of the average size of the abrasive grains.

With reference to specific values, generally the bonding layer has an average thickness of less than about 300 microns. For example, the bonding layer can have an average thickness of less than about 250 microns, 200 microns, 150 microns, or even less than about 100 microns. In accordance with an exemplary embodiment, the bonding layer has an average thickness within a range between about 20 microns and about 300 microns, and more particularly within a range between about 100 microns and about 250 microns.

After applying the bonding layer material to the surface of the substrate, the process of forming the abrasive region can continue by placing abrasive grains within the bonding layer. In particular, placement of abrasive grains in the bonding layer can include placement of a single layer of abrasive grains within the bonding layer. Reference to a single-layered abrasive article is reference to an abrasive article that uses a bonding layer having a thickness sufficient to hold a monolayer of abrasive grains therein, such that each of the abrasive grains can occupy a place on a surface of the substrate and each grain has a portion that is exposed above the bonding layer, and as such the bonding layer is not necessarily a matrix material or vehicle for surrounding the abrasive grains.

The abrasive grains may be distributed within the bonding layer in a random manner having no short range or long range pattern. Alternatively, certain embodiments may use patterns such that the abrasive grains are placed within the bonding layer in an array. For example, the abrasive grains may be distributed within the bonding layer in a self-avoiding random distribution (SARD™).

The abrasive grains can include abrasive materials or superabrasive materials. For example, some such suitable abrasive materials can include oxides, carbides, nitrides, and borides. In particular, suitable abrasive materials can include alumina, silica, silicon carbide, cubic boron nitride, and diamond. In accordance with one particular embodiment, the abrasive grains are made of diamond.

The average grit size of the abrasive grains is generally less than about 400 microns. In other embodiments, the size of the abrasive grains can be less, such as not greater than about 300 microns, not greater than about 250 microns, or not greater than about 200 microns, or even not greater than about 100 microns. In accordance with a particular embodiment, the abrasive grains can have a grit size within a range between about 40 microns to about 400 microns.

Referring again to FIG. 1, after providing a substrate having an abrasive region at step 101, the process continues at step 103 by determining a braze rate based on a power of a beam of electromagnetic radiation and an absorptivity of the bonding layer material. As mentioned previously herein, the process utilizes a beam of electromagnetic radiation to deliver energy to the abrasive region, thereby heating the substrate and bonding layer material to form a brazed abrasive article. In particular instances, the beam of electromagnetic radiation is generated from a laser device, such that the process may be referred to as a laser brazing process. The laser device can have certain characteristics and operational parameters that facilitate the formation of a brazed abrasive article. In particular, certain suitable laser devices include laser diodes or fiber lasers.

The power of the beam of electromagnetic radiation can be not greater than about 5000 W. For example, in some instances the power of the beam is not greater than about 2500 W, such as not greater than about 2000 W, not greater than about 1500 W, and on the order of 1000 W, 800 W, 700 W, or 600 W. Particular processes may utilize a beam operating at a power of at least about 100 W, such as at least about 150 W, at least about 200 W, or even at least about 250 W. Certain embodiments can use a beam operating at a power within a range between about 100 W and about 5000 W, such as within a range between about 100 W and about 2000 W, and more particularly within a range between about 100 W and about 600 W. As will be discussed in more detail herein, the power at which the laser operates is a factor for determining the brazing rate of the brazing process, which can facilitate formation of a suitable brazed abrasive article.

Operation of the beam, particularly with regard to laser devices, can be completed in various modes, including for example pulsed modes of operation wherein the energy output by the laser is pulsed, that is energy is output for a duration, and then no energy is output for a duration. Embodiments herein may utilize beams that are operated in a continuous wave mode such that the beam is not pulsed and the energy output by the laser is constant over the duration of the brazing operation.

Generally, the wavelengths of the beams of electromagnetic radiation used to conduct the brazing operation are particularly suited with respect to the absorptivity of the materials of the bonding layer. The wavelength of the beam of electromagnetic radiation can be not greater than about 20 microns. In certain instances, the wavelength of the beam is less, such as not greater than about 15 microns, not greater than about 12 microns, not greater than about 10 microns, not greater than about 8 microns, or even not greater than about 5 microns. Particular embodiments use a wavelength for the beam within a range between about 0.01 microns and about 20 microns, such as between about 0.01 microns and about 8 microns, or even between about 0.1 microns and about 5 microns.

The process of determining the brazing rate of the brazing process can be based upon the power of the beam of electromagnetic radiation and the absorptivity of the bonding layer. In particular, suitable maximum and minimum brazing area rates can be calculated based on equations described herein, and from these calculations, maximum and minimum brazing rate can be determined. According to one embodiment, the maximum brazing area rate $Vr_{max}$ (mm$^2$/s) is dependent upon the heat flux rate (qr) of the beam of electromagnetic radiation and the absorptivity (a) of the bonding layer material relative to a wavelength of the electromagnetic radiation. For example, the maximum brazing area rate, $Vr_{max}$ (mm$^2$/s) is not greater than the value based on the formula, $Vr_{max}=0.0009(qr)^2-0.06(qr)+1.5$ for a heat flux rate (qr) of at least about 40 W/mm. In certain embodiments, the maximum brazing area rate, $Vr_{max}$ (mm$^2$/s) is not greater than a value based on the formula, $Vr_{max}=0.0009(qr)^2-0.06(qr)+1.5$ for a heat flux rate (qr) of at least about 60 W/mm, or even at least about 80 W/mm. According to other embodiments, the equation $Vr_{max}=0.0009(qr)^2-0.06(qr)+1.5$ can be used to determine the maximum brazing area rate for a heat flux rate (qr) of not greater than about 200 W/mm, such as not greater than about 180 W/mm, not greater than about 160 W/mm, or even not greater than about 140 W/mm. Particular embodiments utilize a maximum brazing rate area based on the equation $Vr_{max}=0.0009(qr)^2-0.06(qr)+1.5$ within a range between about 40 W/mm and about 200 W/mm, and more particularly within a range between about 60 W/mm and about 160 W/mm. The brazing rate can be determined then from the brazing area rate by dividing the value of the maximum brazing area rate by the radius of the beam within the radiation zone. For particular beams utilizing rectangular beams that project a rectangular radiation zone on the target, the radius is equal to half of the width of the radiation zone.

The heat flux rate (qr) represents the effective amount of heat energy delivered to and absorbed at the brazing area. The heat flux rate can be calculated based on the equation $qr=(q/r)*(a)$, wherein q is the power density of the beam in W/mm$^2$, r is the radius of the beam, and (a) is the absorptivity of the bonding layer. Notably, the power density of the beam (q) can be calculated based on the power of the laser divided by the area of the beam within the radiation zone, that is the area of the beam on the surface.

Likewise, a minimum brazing area rate $Vr_{min}$ (mm$^2$/s) can be determined for the brazing process. According to one embodiment, the minimum brazing area rate, $Vr_{min}$ (mm$^2$/s) can be calculated based on the equation $Vr_{min}=0.0006(qr)^2-0.05(qr)+1.5$ for a heat flux rate (qr) of at least about 40 W/mm. In fact, the equation is suitable for calculating the minimum brazing area rate, $Vr_{min}$ for heat flux rates of at least about 60 W/mm, or even 80 W/mm. Additionally, the minimum brazing area rate, $Vr_{min}$ based on the formula, $Vr_{min}=0.0006(qr)^2-0.05(qr)+1.5$, can be used for heat flux rates (qr) of not greater than about 200 W/mm, such as not greater than about 180 W/mm, not greater than about 160 W/mm, or even not greater than about 140 W/mm. Particular embodiments utilize a maximum brazing rate area based on the equation $Vr_{max}=0.0006(qr)^2-0.05(qr)+1.5$ within a range between about 40 W/mm and about 200 W/mm, and more particularly within a range between about 60 W/mm and about 160 W/mm. The brazing rate can be determined then from the brazing area rate by dividing the value of the minimum brazing area rate by the radius of the beam within the radiation zone.

Figure 2:
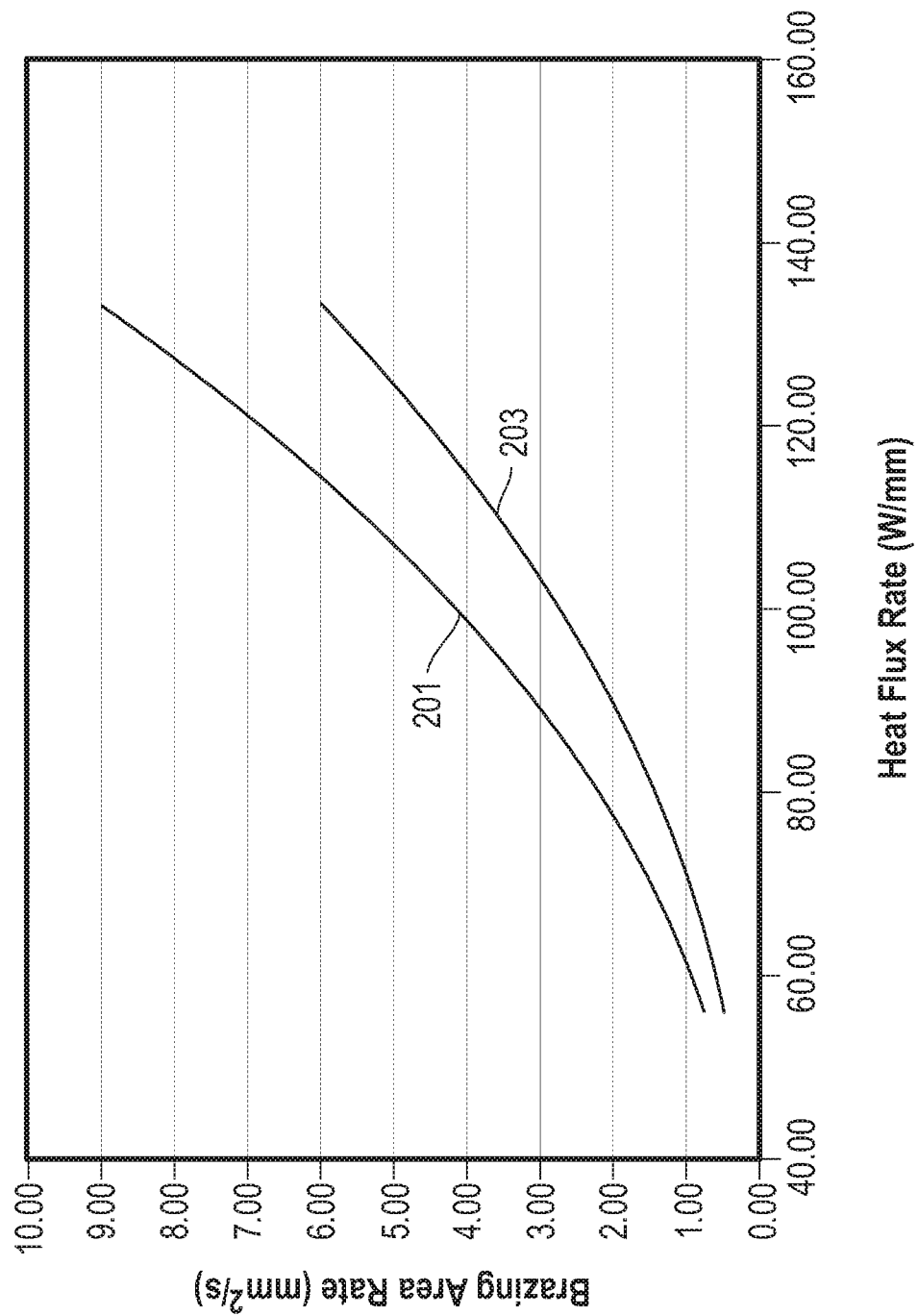
FIG. 2 includes a graph of brazing area rate versus heat flux rate for two plots to determine maximum and minimum brazing rates in accordance with an embodiment.

Referring to FIG. 2, a graph is provided of the heat flux rate versus brazing area rate for two plots representing boundaries for maximum and minimum brazing area rates in accordance with embodiments. Plots 201 and 203 represent boundaries of maximum brazing area rates and minimum brazing area rates, respectively. Plot 201 is represented by the equation $Vr_{max}=0.0009(qr)^2-0.06(qr)+1.5$, while plot 203 is represented by the equation $Vr_{min}=0.0006(qr)^2-0.05(qr)+1.5$. Notably, the maximum and minimum brazing area rates are empirically derived equations based on experimentation and principles of heat transfer. As illustrated, the maximum and minimum brazing area rates increase as the heat flux rate increases as more energy is supplied to the surface of the abrasive region. However, as also demonstrated in FIG. 2, suitable brazing area rates between the minimum and maximum brazing area rates are fewer and the process may be more sensitive at lower heat flux rates. Moreover, certain processes may have maximum brazing limits on the order of not be greater than about 20 mm/s, such as not greater than about 15 mm/s, or even not greater than about 10 mm/s.

The beams of electromagnetic radiation used for the process include other notable features and characteristics that make them particularly suitable for conducting a brazing process. For example, the area on the abrasive region affected by the beam of electromagnetic radiation is defined by a radiation zone. In certain instances, the radiation zone can have a rectangular shape that facilitates application of uniform energy applied to the portion of the abrasive region within the radiation zone. Use of a laser diode may be particularly suitable for generation of a radiation zone having a rectangular shape. The rectangular shape of the radiation zone is defined by a length and width, and the ratio of the length to width can define an aspect ratio that is generally at least about 2:1. In some embodiments, the aspect ratio can be greater, such as at least 3:1, 4:1, 5:1 or even 10:1. According to a particular embodiment, the aspect ratio is within a range between about 2:1 and about 5:1.

In further reference to the dimensions of the radiation zone, the width can be at least about 1 mm, such as on the order of at least about 2 mm, at least about 4 mm, at least about 5 mm, or even at least about 10 mm. In particular embodiments, the width of the radiation zone is within a range between about 1 mm and about 10 mm.

The length of the radiation zone is generally greater than the width such that full coverage of the beam over the abrasive region 201 is utilized. For example, in certain embodiments, the length can be at least about 4 mm, at least about 6 mm, at least about 10 mm, 15 mm, or even at least about 20 mm. Particular embodiments, utilize a length between about 4 mm and about 30 mm, and more particularly, within a range between about 4 mm and about 25 mm.

In other embodiments, the radiation zone can have a different shape, such as a circular shape. Use of a fiber laser device is particularly suitable for a radiation zone having circular shape. In accordance with a particular embodiment, the radiation zone has a diameter of at least about 2 mm. In other embodiments, the diameter is greater, such as at least about 3 mm, or even at least about 5 mm. Certain embodiments utilize a radiation zone having a diameter within a range between about 2 mm and about 5 mm.

Independent of the shape, the radiation zone generally has a generally uniform energy distribution, such that the amount of energy generated by the beam across the area (length and width or diameter) of the radiation zone is substantially constant. That is, the energy distribution is uniform or non-Gaussian, as opposed to lasers having a Gaussian distribution of light energy away from a focal point within a radiation zone. The uniform energy distribution within the radiation zone facilitates uniform heating of the bonding layer and thus the formation of a single-layered abrasive having a uniform and homogeneous braze material. During the brazing operation, the beam of electromagnetic radiation is incident upon a portion of the abrasive region including a portion of the bonding layer and abrasive grains defined as the impingement area to deliver energy and conduct the brazing operation. The impingement area can be defined by a length and a width, and typically, the width of the impingement area is equal to the width of the radiation zone, but the length of the impingement area is less than the length of the radiation zone to assure full coverage of the beam over the portion of the abrasive region within the impingement area. As such, the radiation zone generally defines an area that is within a range between about 5% and about 25% greater than the area of the impingement area.

In accordance with one embodiment, the energy distribution within the impingement area has a change in the energy across the length of not greater than about 10%. In other embodiments, the energy distribution may be less, thus the energy uniformity greater, such that the energy change across the length is not greater than about 5% or even not greater than about 2%.

According to one embodiment, the energy density of the beam within the impingement area is the amount of energy provided to the abrasive portion within the impingement area per unit area. Excessive energy supplied within the impingement area may result in fracture of the abrasive grains and poor bonding behavior as a result of rapid changes in the temperature. For example, in certain embodiments, the energy density within the impingement area is at least about 10 J/mm$^2$, such as at least about 15 J/mm$^2$, at least about 20 J/mm$^2$, or even at least about 25 J/mm$^2$. Particular embodiments utilize an energy density within the impingement area in a range between about 10 J/mm$^2$ and about 100 J/mm$^2$, more particularly within a range between about 15 J/mm$^2$ and about 80 J/mm$^2$, and even more particularly within a range between about 15 J/mm$^2$ and about 60 J/mm$^2$.

Referring again to FIG. 1, after determining a suitable brazing rate at step 103, the process can continue at step 105 including forming a brazed abrasive region by changing the position of the beam relative to the abrasive region at the brazing rate. As will be appreciated, changing the position of the beam relative to the abrasive region can be accomplished in different manners. For instance, in one embodiment, the beam of electromagnetic radiation is moved while the substrate is held stationary. In other instances, the substrate can be moved while the beam is held stationary. In one particular embodiment, both the substrate and the beam can be moved relative to each other to accomplish brazing at the determined brazing rate. Movement of the substrate and the beam can be completed in manner such that the substrate and the beam are moving in opposite directions, which may be particularly suitable for faster brazing rates. Alternatively, the substrate and the beam may be moved in the same direction, wherein such processes may be suitable for lower brazing rates.

Additionally, brazing operations according to embodiments herein can include particular methodologies. For instance, certain brazing operations may make use of a pre-heating process, wherein the beam is directed at a starting location under non-zero power conditions. In particular instances, the starting location may be within the abrasive region containing the bonding layer and the abrasive grains. In other embodiment, the starting location may be separate and spaced apart from the abrasive region such that the beam is incident upon the substrate.

According to embodiments herein, the pre-heating duration can be not greater than about 30 seconds, such as not greater than about 25 seconds, not greater than about 20 seconds, or even not greater than about 15 seconds. Particular embodiments utilize a pre-heating duration within a range between about 1 second and about 15 seconds, and more particularly within a range between about 1 second and about 10 seconds.

Moreover, in some instances the brazing process can include increasing the power of the laser. Increasing the power may be completed while the laser is stationary or alternatively, while changing the position of the beam relative to the substrate. For example, increasing the power may be particularly useful when initiating the brazing process, such as upon moving from the starting location to a second location to begin the brazing process. Additionally, other processes herein may make use of a brazing operation wherein the laser power is decreased during the brazing process. Decreasing the power can be completed while the laser is stationary with respect to the substrate, or alternatively, while the laser is changing positions relative to the substrate. In fact, decreasing the power of the laser may be particularly suitable for ending the brazing process to control the cooling of the workpiece and avoiding thermal shock to the brazed region.

In accordance with embodiments herein, the brazing process can be conducted in an inert environment, such that the abrasive preform is placed within an enclosure or chamber having a substantially inert environment. For example, the abrasive preform can be contained within an enclosure wherein the ambient atmosphere is purged and filled with an inert environment, such as a noble gas, for example argon. In accordance with one embodiment, the abrasive preform can be contained within an enclosure, which may not be sealed, however an inert gas is flowed into the enclosure and over the surface of the abrasive preform during the brazing operation to avoid oxidation of the components.

Figure 3A:
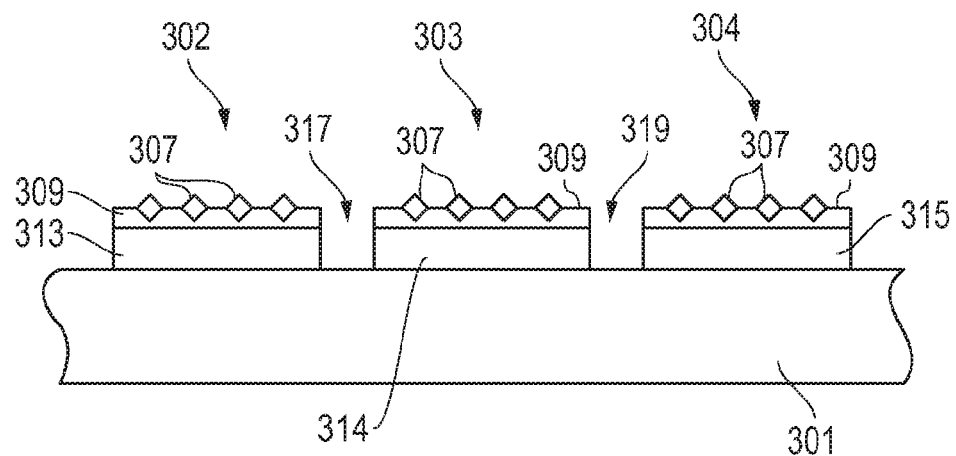
FIG. 3A-3H provide illustrations of different single-layered abrasive articles formed according to embodiments herein.

FIGS. 3A-3H present figures illustrating various single-layered brazed abrasive articles formed according to processes herein. FIG. 3A includes a cross-sectional illustration of a portion of a single-layered abrasive article. FIG. 3A illustrates abrasive portions 302, 303, and 304 (302-304) are formed on raised portions 313, 314, and 315 (313-315) of the substrate 301. The abrasive article further includes non-abrasive regions 317 and 319, which can exist as channels between the raised portions 317 and 317. Formation of the raised portions 313-315 facilitates heat dissipation during the brazing process and avoids excessive thermal damage to the brazed regions, particularly in the context of high-power beams. The raised portions 313-315 define upper major surfaces extending above the lower major surface of the substrate 301, that is, the upper surface of the substrate within the channels 317 and 319. As illustrated, the abrasive portions 302-304 are overlying the upper major surfaces of the raised portions 313-315, such that the bonding layer 309 and abrasive grains 307 in each of the abrasive portions 302-304 are disposed on top of the upper surfaces.

Figure 3B:
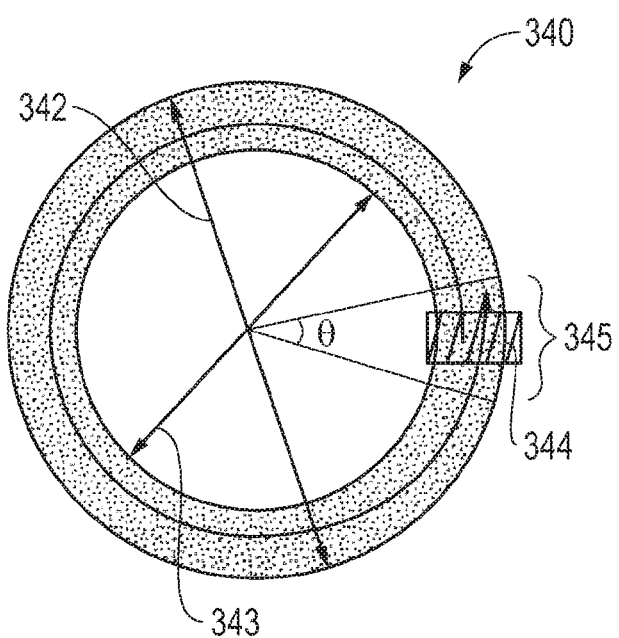

FIG. 3B includes an illustration of a single-layered abrasive article in accordance with an embodiment. In particular, FIG. 3B illustrates a single-layered abrasive article 340 having an annular shape including an outer diameter 342 and an inner diameter 343. The brazed region 344 covers the major surface of the substrate between the inner diameter 343 and the outer diameter 342. The shape of the abrasive article can result in a unique processing technique, including some overlap of the brazed regions. Accordingly, the process can involve increasing and decreasing the power of the beam 344 during the brazing process, and particularly controlled decrease of the power of the beam 344 in the overlap region 345 during completion of the brazing process.

Figure 3C:
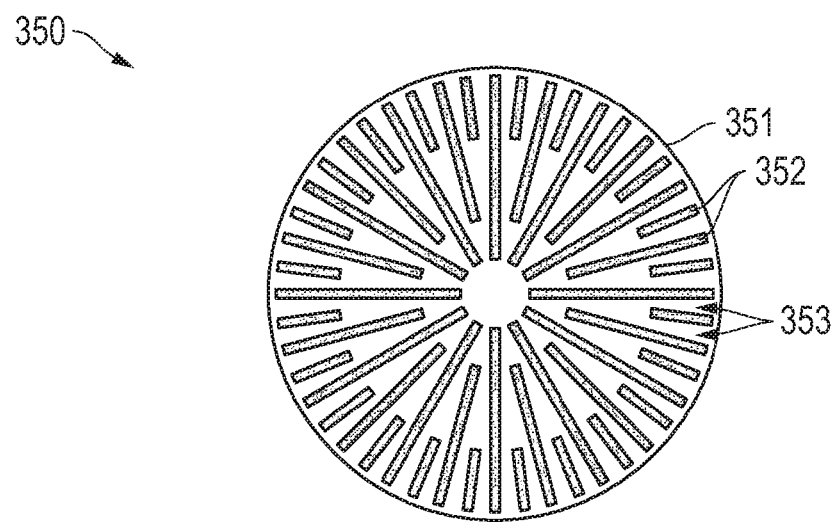

FIGS. 3C-3H include illustrations of different abrasive tools incorporating a single-layered brazed abrasive articles formed according to embodiments herein. FIG. 3C includes a top view illustration of a single-layered abrasive article in accordance with an embodiment. In particular, the single-layered abrasive article 350 includes a substrate 351 having a circular shape and abrasive regions 352 overlying the surface of the substrate 351. The abrasive regions 352 can include a bonding layer and abrasive grains according to embodiments herein. As illustrated, the abrasive regions 352 are arranged in a pattern around a center on the surface of the substrate 351 and each of the abrasive regions 352 have a generally linear shape, however certain abrasive regions 352 have different lengths than others. Notably, the abrasive regions 352 are spaced apart from each other by non-abrasive regions 353 that do not include the bonding layer and abrasive grains. The single-layered abrasive article 350 may be suitable for use in grinding or polishing applications, for example, one particular application may be a CMP pad conditioner.

Figure 3D:
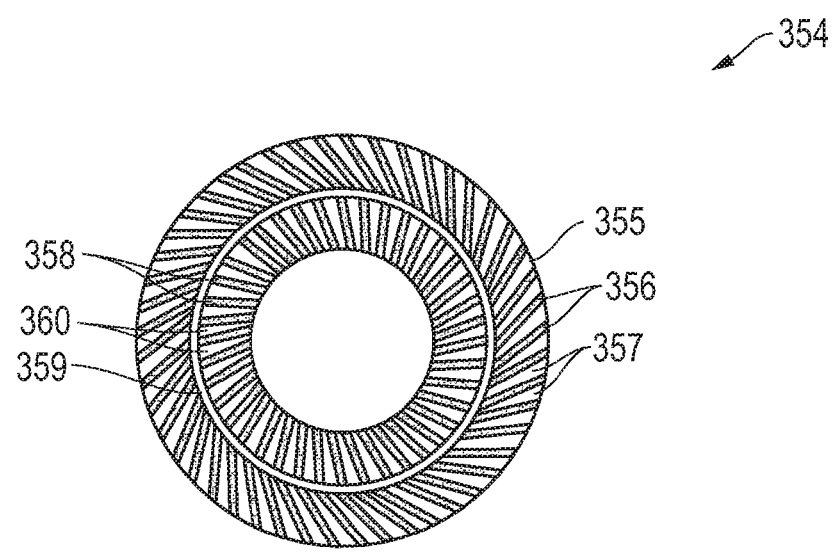

FIG. 3D includes a top view illustration of a single-layered abrasive article 354 in accordance with an embodiment. In particular, the single-layered abrasive article 354 includes a substrate 355 having a circular shape an outer abrasive region comprising abrasive regions 356 overlying the surface of the substrate 355 proximate to the outer periphery of the substrate 355 and arranged in an annular formation. As illustrated, each of the abrasive regions 356 within the outer abrasive region are separated from each other by non-abrasive regions 357. The article 354 further includes an inner abrasive region comprising abrasive regions 358 arranged in an annular formation within the outer abrasive regions on the surface of the substrate 355. Each of the abrasive regions 358 are separated by non-abrasive regions 360. As illustrated, the inner abrasive region is separated from the outer abrasive region by an annular non-abrasive region 359. It will be appreciated that the abrasive regions 356 within the outer abrasive region can be different than the abrasive regions 358 within the inner abrasive region. That is, for example, the abrasive regions 356 and 358 can differ in size, orientation, shape, type of bonding layer material, or even size of abrasive grains contained therein. The single-layered abrasive article 354 may be suitable for use in grinding or polishing applications, for example, one particular application may be a CMP pad conditioner.

Figure 3E:
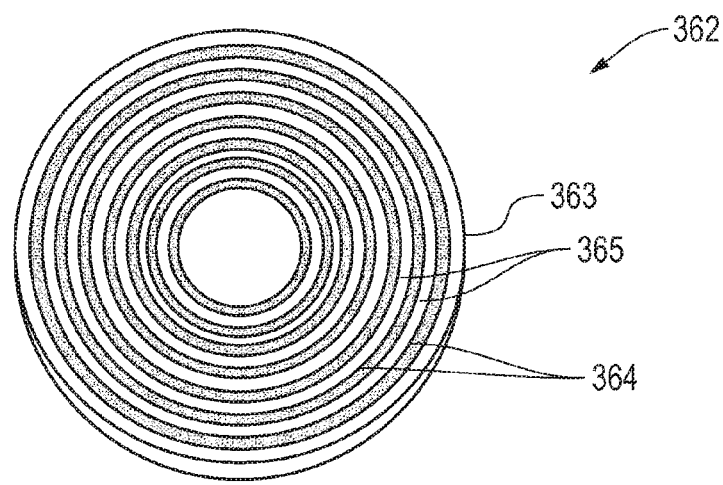

FIG. 3E includes a top view illustration of a single-layered abrasive article in accordance with an embodiment. In particular, the single-layered abrasive article 362 includes a substrate 363 having a circular shape and abrasive regions 364 overlying the surface of the substrate 363. As illustrated, each of the abrasive regions 364 have generally arcuate shapes extending in a semi-circular manner around portions of the surface of the substrate 363. Each of the abrasive regions 264 are separated by non-abrasive regions 365. The single-layered abrasive article 362 may be suitable for use in grinding or polishing applications, for example, one particular application may be a CMP pad conditioner.

Figure 3F:
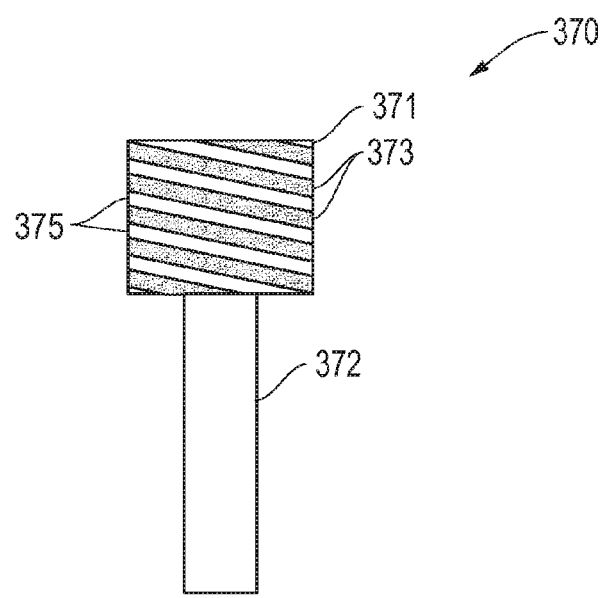

FIG. 3F includes a side view illustration of a single-layered abrasive article in accordance with an embodiment. In particular, the single-layered abrasive article 370 is a tool including a handle 372 for use by an operator, or alternatively for coupling to another tool, such as a selectable head of a motorized handheld tool. The tool includes a head portion 371 that includes a single-layered abrasive article including a substrate, and abrasive regions 373 arranged in a helical pattern around the head portion 371. The abrasive regions 373 are separated from each other by non-abrasive regions 375. The single-layered abrasive article 370 can be used in grinding or polishing applications, and particularly surface, corner, or edge grinding applications.

According to an alternative embodiment, the head portion 371 of the tool can be formed by a different process. For example, the substrate can be a flexible material, such as a metal, generally having an average thickness of less than about 2 mm. Abrasive regions can be formed on the surface of the substrate by a brazing procedure according to embodiments herein. After completing the brazing process, the substrate can be formed around the head portion 371. The forming process can include bending, twisting, or otherwise shaping the flexible substrate to a surface of the tool. As such, it will be appreciated that the substrate can further be affixed to the surface of the tool, for example by use of an adhesive or mechanical attachment.

Figure 3G:
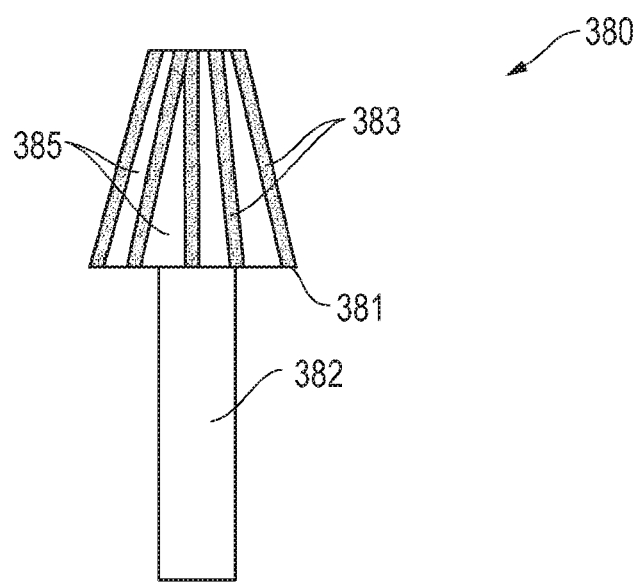

FIG. 3G includes a side view illustration of a single-layered abrasive article in accordance with an embodiment. Like the article of FIG. 3F, the single-layered abrasive article 380 is a tool including a handle 382 for use by an operator, or alternatively for coupling to another tool, such as a selectable head of a motorized handheld tool. The tool includes a head portion 381 that includes a single-layered abrasive article including a substrate, and abrasive regions 383 arranged in a pattern around the head portion 381. The abrasive regions 383 are separated from each other by non-abrasive regions 385. The single-layered abrasive article 380 can be used in grinding or polishing applications, for example, one particular use can include surface, corner, or edge grinding applications.

Figure 3H:
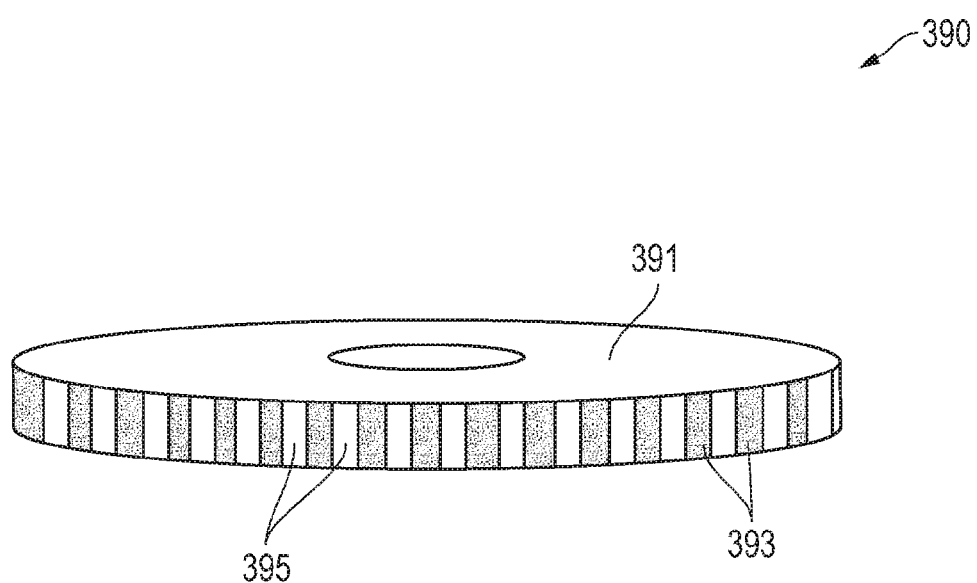

FIG. 3H includes a side view illustration of a single-layered abrasive article in accordance with an embodiment. In particular, the single-layered abrasive article 390 includes a substrate 391 having a disk shape and abrasive regions 393 overlying the side surface of the substrate 391. Each of the abrasive regions 393 have generally linear shapes extending along the sides between the major surfaces of the substrate 393. Each of the abrasive regions 393 are separated by non-abrasive regions 395. The single-layered abrasive article 390 may be suitable for use in grinding or polishing applications, and particularly an edge grinder.

Example 1

Samples were formed using two different sources of electromagnetic radiation (i.e., lasers) at different powers and different speeds to determine the relationship between absorptivity of the bonding layer, the brazing rate, and the power of the laser. All of the samples were formed on substrates of stainless steel, the bonding layer material (i.e., braze material) was a nickel and chrome braze commonly available from the Wall Colmonoy Corporation as Nicrobraz™. The braze was formed into a brazing paste by mixing about 15 wt % binder material, containing Vitta Braz-Binder Gel commonly available from Vitta Corporation, with 85 wt % metal grains to form a bonding layer having a porosity of approximately 58 vol % as determined by measuring the thickness (volume) of the bonding layer on the substrate before the brazing process and after measuring the thickness of the bonding layer after the brazing process. A single layer of abrasive grains having an average grit size of 250 μm was placed in a random distribution within the bonding layer.

TABLE 1

| Brazing Rate (mm/s) | Group A Laser Power (W) | Group B Laser Power (W) |
|---|---|---|
| 0.8 | 167 | |
| 1 | | 350 |
| 1.25 | 184 | |
| 1.5 | 203 | |
| 2 | 220 | 450 |
| 3 | 251 | |
| 4 | 290 | 600 |
| 8 | | |
| 10 | | 800 |

As provided in Table 1, a first group of the samples (Group A) were brazed using a fiber laser available from IPG Photonics Corporation commonly available as YLR HP Series. The laser had a wavelength of 1 micron and a radiation zone having a radius of 3 mm. The laser was used at various powers and various speeds to form single-layered abrasive articles having suitable brazes, which includes forming braze layers demonstrating suitable wetting of the substrate surface, homogeneity of the braze as evidenced by a uniform thickness and color, lack of bubbles, and uniform distribution of the abrasive grit. A second set of samples, presented as Group B Samples in Table 1, were formed with a $CO_2$ laser, available from Alabama Laser. The laser had a wavelength of 10.6 microns and was operated such that the radiation zone having a radius of 3 mm and a standard Gaussian energy distribution through the radiation zone. Brazing was conducted with the $CO_2$ laser at various speeds and powers until samples were formed having suitable brazes. Notably, Group B samples did not demonstrate brazed layers that were as suitable as the brazes formed by the Group A samples.

Figure 4:
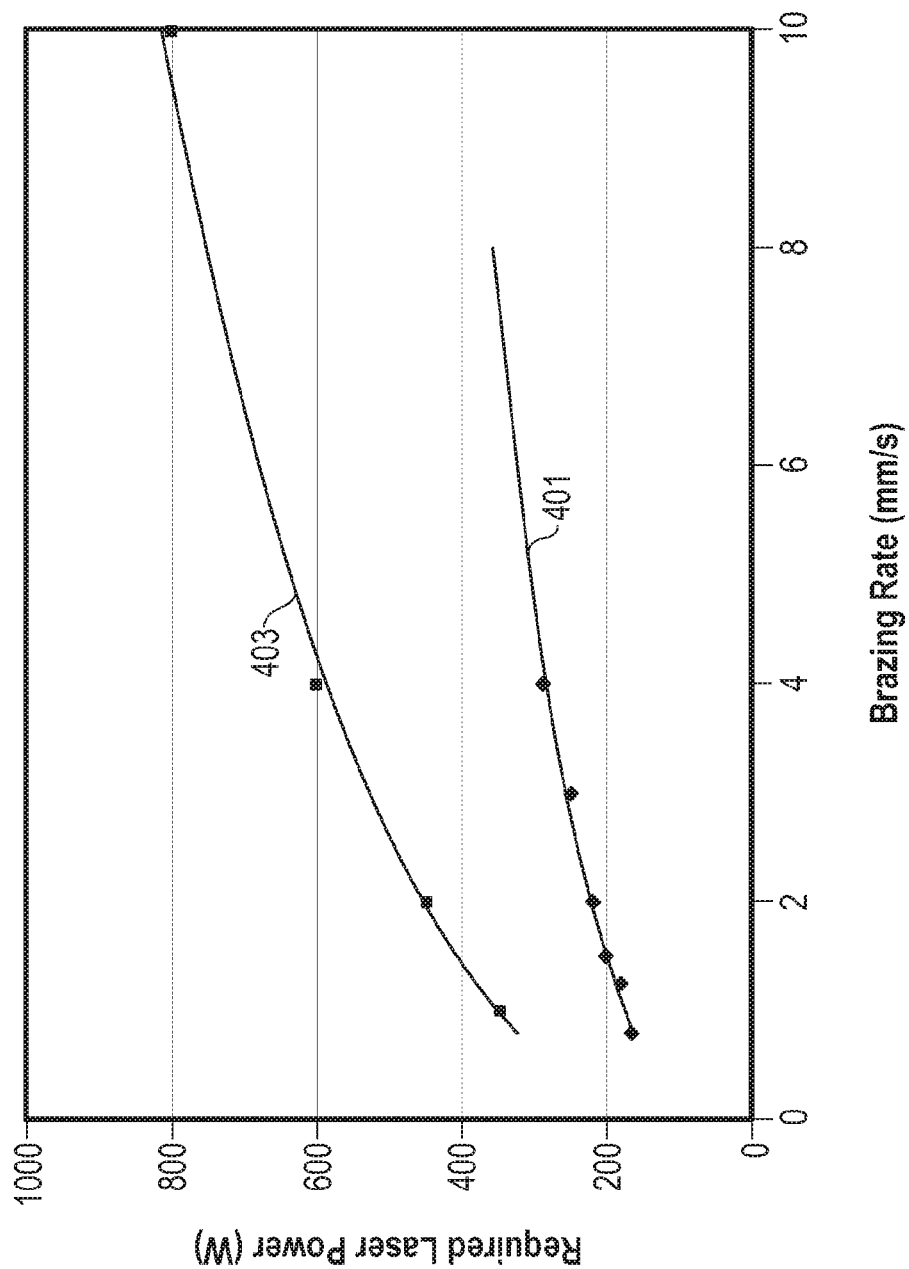
FIG. 4 includes a graph illustrating laser power versus brazing rate for brazed abrasive articles formed in accordance with embodiments herein and brazed abrasive articles formed according to another method.

As noted in Table 1 above, the power of the laser used to form suitable brazed articles was significantly lower for samples in Group A than samples of Group B for samples having the same brazing rates. As more clearly illustrated in FIG. 4, a graph is presented of laser power (W) versus brazing rate (mm/s) for all of the samples formed from both Groups. In particular, plot 401 represents a trendline for the samples of Group A, while plot 403 represents a trendline for the samples of Group B. As illustrated, the power necessary to form suitably brazed articles for the samples of Group B is more than twice as great as compared to samples of Group A at corresponding brazing rates. Accordingly, the absorptivity of the bonding layer, the power of the laser used, and the area of the beam can have a significant impact on the efficiency of the brazing operation. In fact, a brazing operation that is more efficient and uses less energy to accomplish the brazing process results in less overall damage to the components and a better braze.

Figure 5:
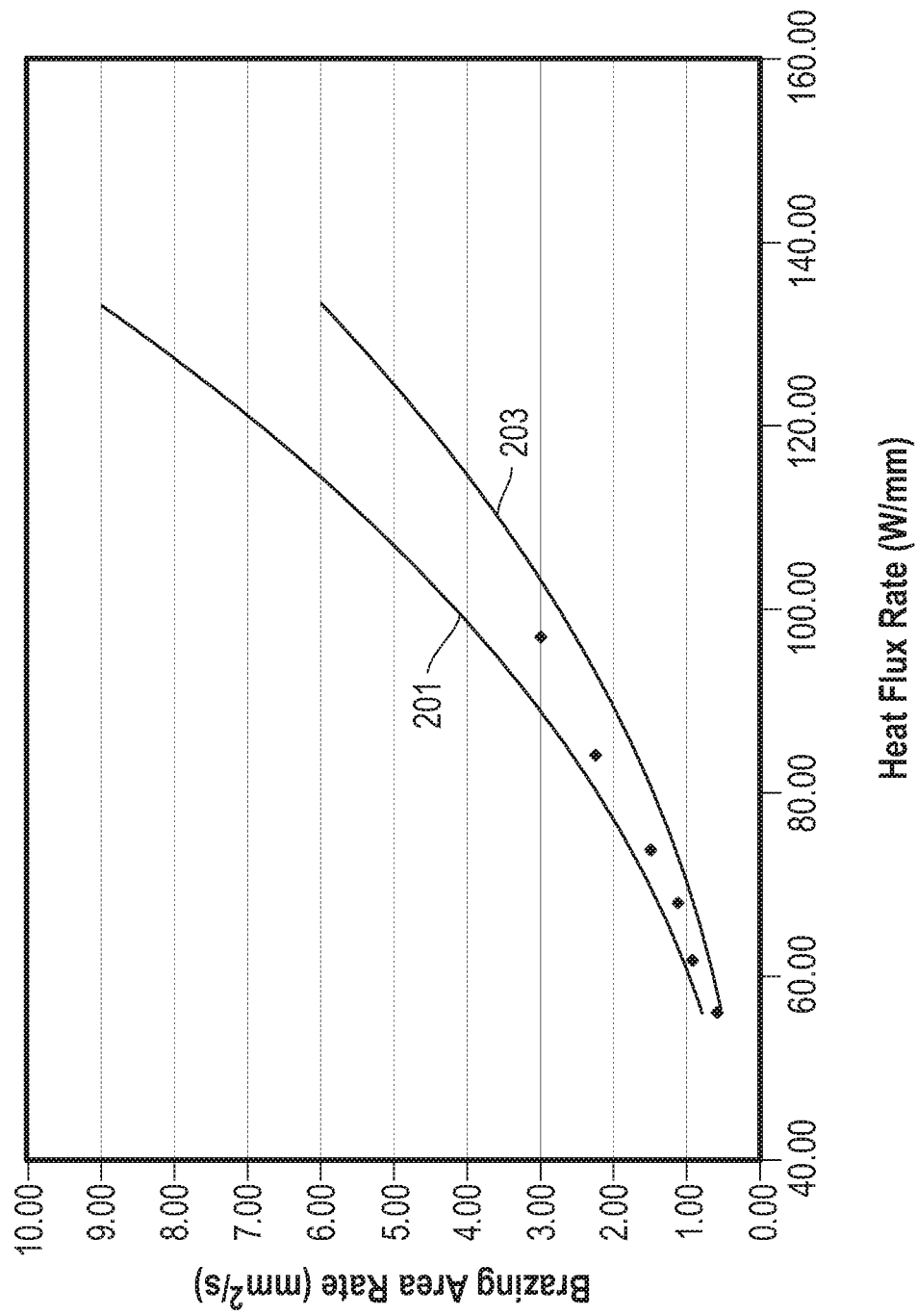
FIG. 5 includes a graph illustrating the plots of FIG. 2 with data points illustrated between the two plots generated from samples from Example 1 in accordance with an embodiment.

Upon determining that all samples of Group A formed suitable brazed abrasive articles, the brazing area rate and heat flux rate for all of the samples of Group A were calculated and plotted. As illustrated in FIG. 5, each of the samples are illustrated as plot points which fall between the plots of 201 and 203 representing the maximum and minimum brazing area rates, respectively. For the calculation and plotting of these points, it was determined that the diffusivity of the steel substrate was $3.0\text{E-}6 \text{ m}^2/\text{s}$, the absorptivity was 0.5, and the conductivity of the steel substrate layer 16 W/m° C. Accordingly, FIG. 5 demonstrates that all of the samples from Group A having a suitable braze were formed within the boundaries defined by the equations of plots 201 and 203. FIG. 5 validates that the equations can be relied upon to determine suitable brazing rates for controlled processing parameters including laser power, area of the beam of electromagnetic radiation in the radiation zone, and absorptivity of the braze.

Particular Brazing Processes According to One Aspect

Figure 6:
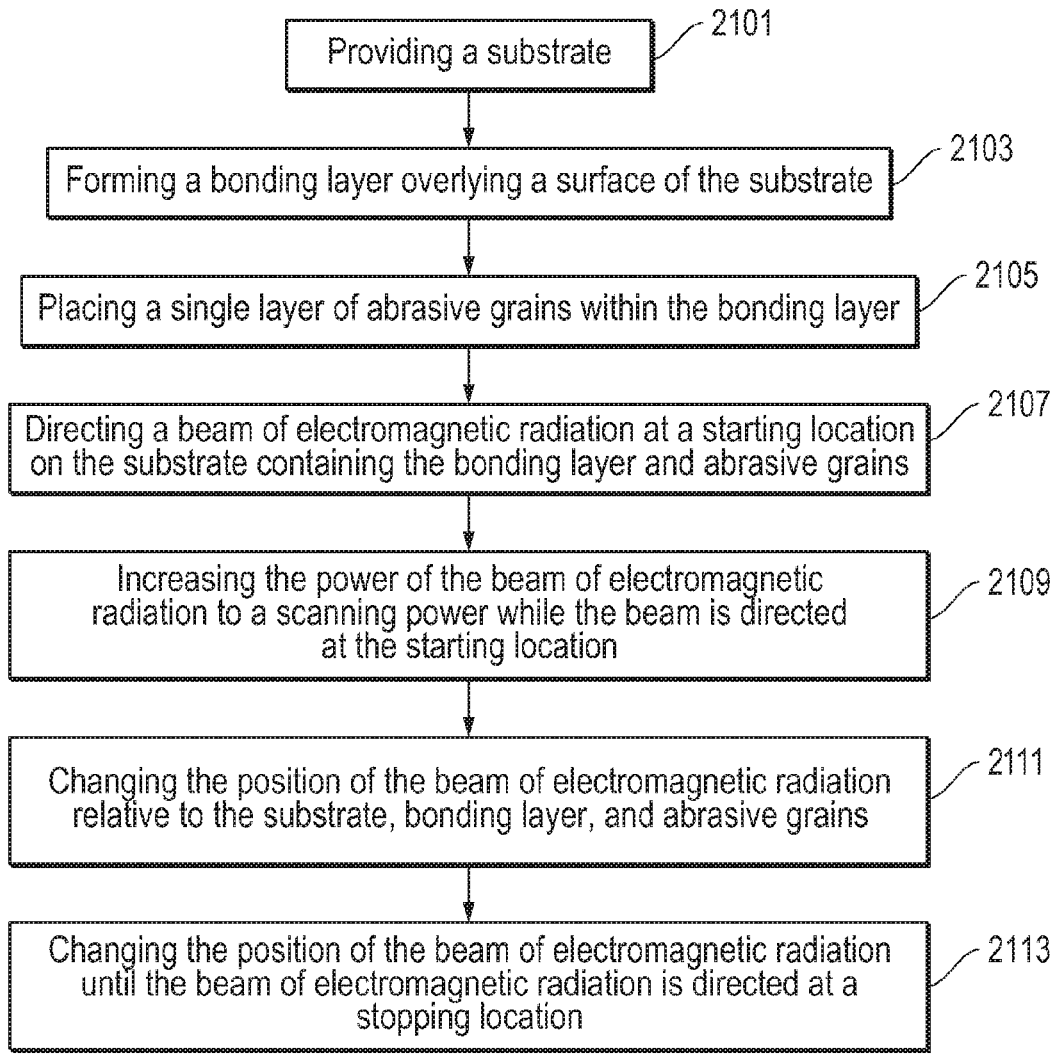
FIG. 6 includes a flowchart illustrating a process for forming a single-layered abrasive article using a particular brazing procedure in accordance with an embodiment.

FIG. 6 includes a flow chart illustrating a brazing process for forming a single-layered abrasive article in accordance with an embodiment. The process is initiated at step 2101 where a substrate is provided. Generally, the substrate is a piece of material having a surface suitable for holding subsequently formed layers thereon, for example the bonding layer and layer of abrasive grains. The substrate can have certain shapes, for example, common polygonal shapes such that it is circular or rectangular. Other shapes can include an annulus.

In accordance with one embodiment, the substrate can includes those materials noted herein. Additionally, the substrate can be a substantially rigid material having a particular thickness suitable for supporting component layers thereon, and also sufficient to withstand the forces common in abrasive applications, and the brazing process without undue warping. For example, the average thickness of the substrate is at least about 10 mm. In certain other embodiments, the average thickness can be greater, such as at least about 12 mm, at least about 15 mm, or even at least about 20 mm. Particular embodiments utilize substrates having an average thickness within a range between about 10 mm and about 25 mm.

After providing the substrate at step 2101, the process continues at step 2103 by forming a bonding layer overlying a surface of the substrate. The bonding layer provides an interface for attaching abrasive grains to the substrate and use of the tool in abrasive applications. Formation of the bonding layer can include application of a thin layer of bonding material to a select surface of the substrate. Some suitable methods of forming the layer of bonding material can include application of a paste or tape containing the bonding layer material to a select surface of the substrate.

According to one embodiment, the bonding layer can be a metal-containing material including those materials noted herein, including minor amounts of other non-metal species, for example, silicon.

In accordance with a more particular embodiment, the bonding layer is a metal alloy containing primarily nickel and chromium. The bonding layer can generally contains minor amounts of organic materials, oxygen, nitrogen, hydrogen, and a combination thereof as noted herein.

Moreover, the bonding layer can have an average thickness as noted in the embodiments herein, such as, not greater than about 75% of the average grain size of the abrasive grains used, and alternatively stated, an average thickness of less than about 300 microns. For example, the bonding layer can have an average thickness of less than about 250 microns, 200 microns, 150 microns, or even less than about 100 microns. In accordance with an exemplary embodiment, the bonding layer has an average thickness within a range between about 20 microns and about 300 microns, and more particularly within a range between about 100 microns and about 250 microns.

After forming the bonding layer on the surface of the substrate at step 2103, the process continues at step 2105 by placing a single layer of abrasive grains within the bonding layer. Such as process can be conducted in accordance with the methods described in other embodiments herein.

The abrasive grains can include abrasive materials or superabrasive materials as noted in embodiments herein. Moreover, the average grit size of the abrasive grains can include grit sizes noted in other embodiments herein. Notably, unlike other forming methods, the present method utilizes distinct steps for the application of the bonding layer and the application of abrasive grains, as opposed to forming a mixture combining the bonding material and abrasive grains and then single application of the mixture to a surface. This allows the select placement of the abrasive grains within the bonding layer as well as suitable formation of a single-layered abrasive article.

After placing a single layer of abrasive grains within the bonding layer at step 2105, the process continues at step 2107 by directing a beam of electromagnetic radiation at a starting location on the substrate containing the bonding layer and abrasive grains. The beam of electromagnetic radiation is sufficient to heat the bonding layer and cause brazing of the bonding layer, thereby attaching or fixing the abrasive grains to the substrate. Notably, in accordance with an embodiment, the beam of electromagnetic radiation is generated by a laser device, such that the process may be referred to as a laser brazing process. Additionally, the laser device can have certain characteristics and parameters that facilitate the formation of a brazed single-layered abrasive article. For example, in accordance with one particular embodiment, the laser device is a laser diode.

Generally, the wavelengths of the beams of electromagnetic energy used to conduct the brazing operation are particularly suited with respect to the absorptivity of the materials of the bonding layer. As such, the wavelength of the beam of electromagnetic energy is generally not greater than about 20 microns. In other instances, the wavelength of the beam of electromagnetic radiation is less, such as not greater than about 15 microns, not greater than about 12 microns, not greater than about 10 microns, not greater than about 8 microns, or even not greater than about 5 microns. Particular embodiments use a wavelength for the beam of electromagnetic radiation within a range between about 0.01 microns and about 20 microns, such as between about 0.01 microns and about 10 microns, or even between about 0.1 microns and about 5 microns.

The particular brazing process of FIG. 6 can be conducted with a beam having a specific power such that the energy supplied to the bonding layer. Notably, the beams disclosed herein are particularly high powered beams, operating at a power of at least about 800 W. In certain embodiments, the beam can have a greater power, such as at least about 1000 W, at least about 1200 W, at least about 1500 W, or even at least about 2000 W. In accordance with a particular embodiment, the beam has a power within a range between 800 W and 5000 W, and more particularly within a range about 1000 W and 2400 W.

Operation of the beam, particularly with regard to laser devices, can have various modes of operation, including for example pulsed modes of operation wherein the energy output by the laser is pulsed, that is energy is output for a duration, and then no energy is output by the laser for a duration. In particular embodiments, the beams of electromagnetic radiation are operated in a continuous wave mode such that the beam is not pulsed and the energy output by the laser is constant over the duration of the brazing operation.

Figure 7:
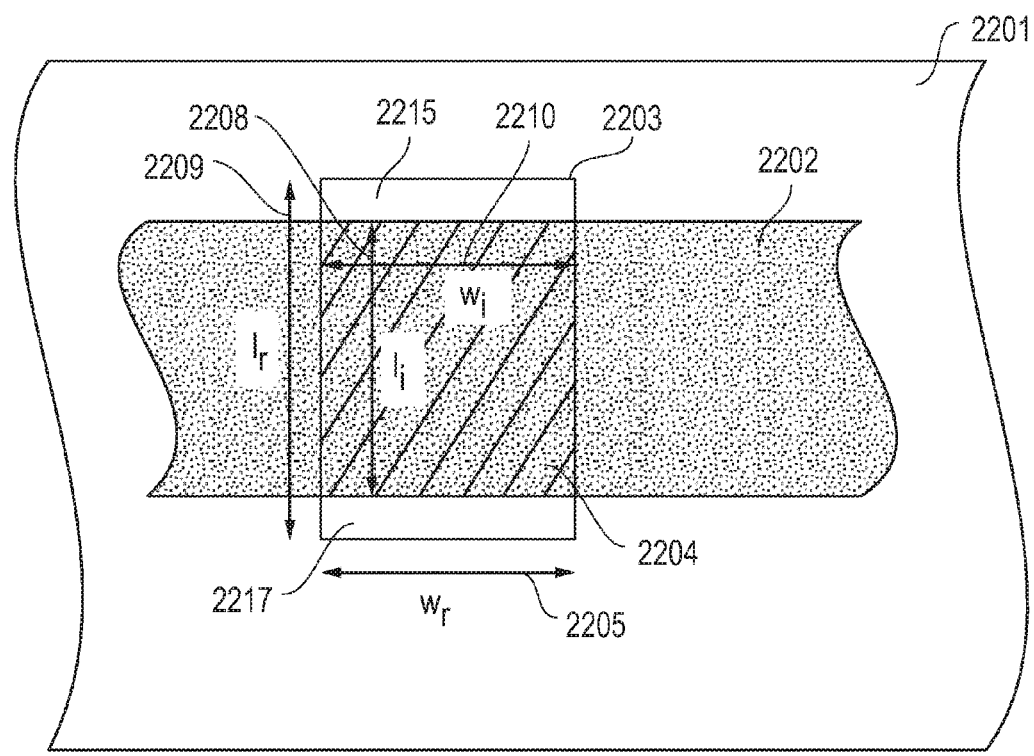
FIG. 7 includes a top view illustration of a single-layered abrasive article during a brazing process in accordance with an embodiment.

Referring briefly to FIG. 7, other characteristics of the beam of electromagnetic radiation are illustrated. FIG. 7 includes a top view of a portion of a single-layered abrasive article during a brazing process having an impinging beam of electromagnetic radiation thereon. In particular, FIG. 7 includes an illustration of a portion of a single-layered abrasive preform 2201 including an abrasive region 2202 including the bonding layer and abrasive grains.

As illustrated, the area on the abrasive preform 2201 effected by the beam of electromagnetic radiation is defined by a radiation zone 2203 having a rectangular shape that facilitates application of uniform energy applied to the portion of the preform 2201 within the radiation zone 2203. The rectangular shape of the radiation zone 2203 is defined by a length 2209 and width 2205. In accordance with a particular embodiment, the ratio of the length 2209 to width 2205 defines an aspect ratio that is generally at least about 2:1. In other embodiments, the aspect ratio of the radiation zone 2203 can be different, such as at least 3:1, 4:1, 5:1 or even 10:1. According to a particular embodiment, the aspect ratio is within a range between about 2:1 and about 5:1.

In further reference to the dimensions of the radiation zone 2203, the width 2205 is at least about 1 mm. In accordance with other embodiments the width 2205 of the radiation zone 2203 can be greater, such as at least about 2 mm, at least about 4 mm, at least about 5 mm, or even at least about 10 mm. In accordance with a particular embodiment, the width 2205 of the radiation zone 2203 is within a range between about 1 mm and about 10 mm, and more particularly, within a range between about 1 mm and 8 mm.

The length 2209 of the radiation zone 2203 is greater than the width 2205, and more particularly has a length 2209 that is greater than the length 2208 of the impingement area 2204, assuring full coverage of the beam over the width of the abrasive region 2202. For example, in certain embodiments, the length 2209 can be at least about 4 mm. In other embodiments, the length 2209 of the radiation zone 2203 can be greater, such as at least about 6 mm, at least about 10 mm, at least about 15 mm, or even at least about 18 mm. Particular embodiments, utilize a length between about 4 mm and about 30 mm, and more particularly, within a range between about 4 mm and about 25 mm.

The radiation zone 2203 can have a substantially uniform energy distribution, such that the amount of energy generated by the beam across the majority of the length 2209 of the radiation zone 2203 is substantially constant, that is, a non-Gaussian distribution as opposed to lasers having a Gaussian distribution of light energy away from a focal point within a radiation zone. The uniform energy distribution within the radiation zone 2203 facilitates uniform heating of the bonding layer and thus the formation of a single-layered abrasive having a uniform and homogeneous braze material.

As further illustrated in FIG. 7, the beam of electromagnetic radiation is incident upon an abrasive region 2202 within the abrasive preform 2201 defined as the impingement area 2204. Notably, the impingement area 2204 includes a portion of the bonding layer and a plurality of abrasive grains such that after a single pass over the abrasive region 2202, the beam has impinged upon the full width of the abrasive region 2202 supplying sufficient energy to effectively braze the material. The impingement area 2204 is defined by a length 2208 and a width 2210. Notably, the width of the impingement area 2204 is equal to the width of the radiation zone 2203. However, the length of the impingement area 2204 is less than the length 209 of the radiation zone 2203. The additional length of the radiation zone 2203 results in regions 2215 and 2217 that define portions of the radiation zone 2203 which are not incident upon the abrasive region 2202.

In accordance with one embodiment, the energy distribution within the impingement area 2204 is particularly uniform, such that the change in the energy across the length 2208 of the impingement area 2204 is not greater than about 10%. In other embodiments, the energy distribution within the impingement area may be less, such that the change in energy across the length 2208 of the impingement area 2204 is not greater than about 8%, such as not greater than about 5%, or even not greater than about 2%. The energy uniformity across the length 2208 is suitable for providing a uniform amount of energy to the abrasive region 2202 thus resulting in a brazed abrasive article having a uniform braze layer having superior properties.

According to one embodiment, the beam is incident upon the impingement area 2204 of the abrasive region 2202 and the energy density of the beam within the impingement area 2204 is at least about 10 J/mm$^2$. As will be appreciated, the energy density is the amount of energy provided to the abrasive preform 2201 within the impingement area 2204 per unit area. The greater the energy provided to the abrasive region 2202 within the impingement area 2204 the greater energy supplied to the bonding layer and abrasive grains, and potentially the quicker the brazing procedure. It will be appreciated that too great an energy supplied within the impingement area 2204 may result in fracture of the abrasive grains and poor bonding behavior as a result of rapid changes in the temperature. For example, in certain embodiments, the energy density within the impingement area 2204 is within a range between about 10 J/mm$^2$ and 100 J/mm$^2$, and more particularly within a range between about 10 J/mm$^2$ and about 80 J/mm$^2$. In a more particular embodiment, the energy density within the impingement area 2204 is within a range between about 10 J/mm$^2$ and about 70 J/mm$^2$.

In particular instances, the dimensions of the radiation zone 2203 cover a certain area within the impingement area 2204 to assure coverage of the full length 2208 within the impingement area 2204 and minimizing energy expended within regions 2215 and 2217. In accordance with certain embodiments, the radiation zone 2203 has an area that is greater than the impingement area 2204 by at least about 5%. In other embodiments, the radiation zone 2203 has an area that is at least about 10% greater, such as at least about 15% greater, or even at least about 25% greater than the impingement area 2204. Particular embodiments utilize a radiation zone 2203 having an area within a range between about 5% and about 25% greater than the impingement area 2204.

Referring again to step 2107 of the process of FIG. 6, the step of directing a beam of electromagnetic radiation at a starting location on a substrate includes directing the beam at a portion of the abrasive portion 2201 under non-zero power conditions. That is, the beam is directed at a starting location and emitting energy to the abrasive preform in order to pre-heat the abrasive preform and prepare it for the brazing operation.

Figure 8:
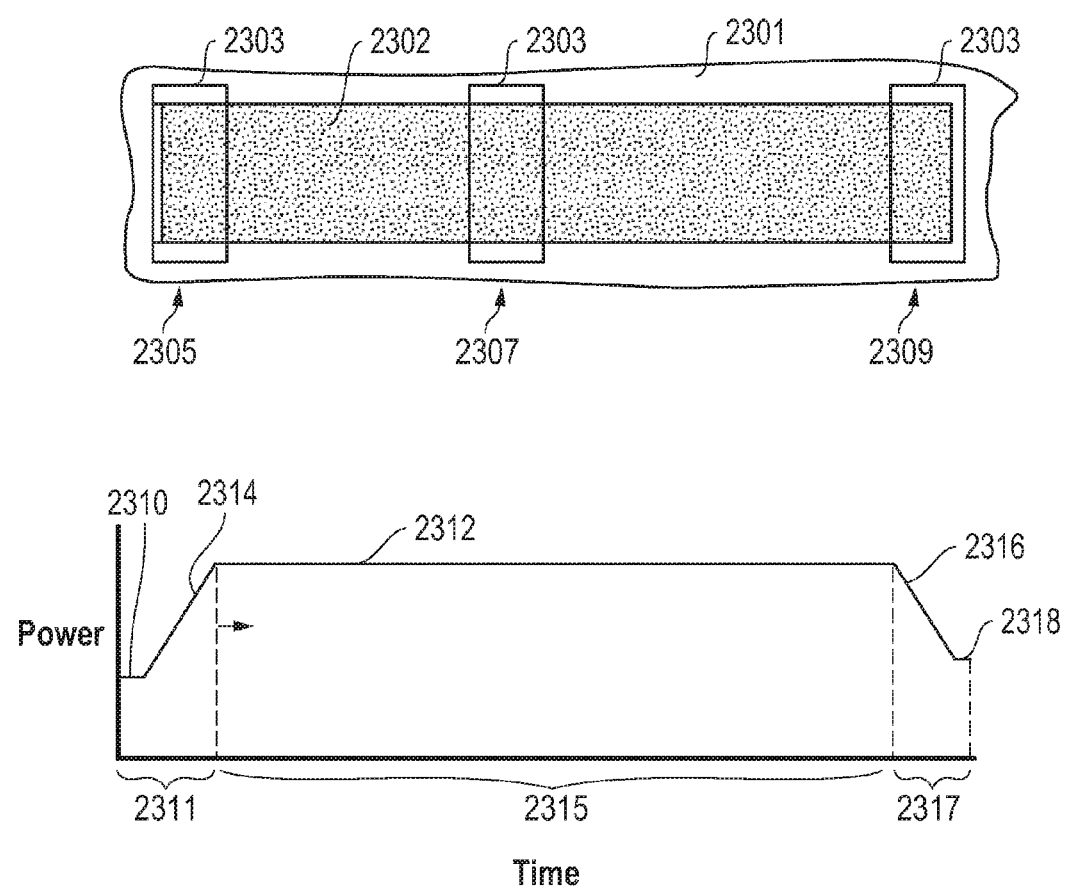
FIG. 8 includes a top view of a single-layered abrasive article during a brazing process and an accompanying plot illustrating the power versus time of the beam of electromagnetic radiation during the brazing process in accordance with an embodiment.

Referring briefly to FIG. 8, a top view of a portion of an abrasive region during a brazing operation is illustrated and accompanied by a plot illustrating power versus time for the beam during certain stages of the brazing operation. As illustrated, the area affected by the beam as defined by the radiation zone 2303 is initially directed at a starting location 2305 on an abrasive preform 2301 including an abrasive region 2302 (i.e., a region including the bonding layer and abrasive grains). Notably, the radiation zone 2303 is substantially overlying an end of the abrasive region 2302 such that a majority of the width of the radiation zone 2303 is directed at the abrasive region 2302. Such an orientation ensures that energy is directly impinging upon the abrasive region 2302 at the starting location 2305 and suitable pre-heating occurs. As illustrated in the accompanying plot, the power of the beam at the starting location 2305 is represented by the power within region 2311. As illustrated, at the starting location 2305, the beam has an initial or pre-heating power 2310 sufficient to initiate heating of the abrasive region 2302.

Referring again to FIG. 6, after directing the beam at a starting location at step 2107, the process continues at step 2109 by increasing the power of the beam of electromagnetic radiation to a scanning power while the beam is directed at the starting location. Referring again to FIG. 8, as illustrated within region 2311, while the beam is directed at the starting location 2305, the power of the beam is increased from a pre-heating power 2310 to a scanning power 2312. In accordance with one embodiment, the power is increased to the scanning power, which is at least about 10% greater than the pre-heating power 2310. In certain other embodiments, the increase in the power can be greater, such that the beams power is increased by at least about 50%, such as least about 75%, at least about 100%, or even at least about 150% of the pre-heating power 2310. Particular embodiments utilize an increase in the power that is not greater than about 300% of the pre-heating power, and more particularly within a range between about 10% and about 200% of the pre-heating power 2310.

The change in the power from the pre-heating power 2310 to the scanning power 2312 can be a constant rate increase 2314. Still, according to alternative embodiments, the power of the beam may be increased as a step function, that is increased to a second intermediate temperature and held for a duration, increased to a third temperature and held for a duration, and so on until the scanning power 2312 is obtained. In either case, generally the average rate of increase is at least about 20 W/sec. For example, certain embodiments utilize an average rate increase of at least about 100 W/sec, at least about 300 W/sec, or even at least about 500 W/sec. Particular embodiments generally have an average rate increase within a range between 100 W/sec and about 1000 W/sec.

Generally, the beam can be held at the starting location 2305 for a duration referred to as a pre-heating duration, which includes the duration of the pre-heating power 2310 and the time to increase the power to the scanning power 2312. The pre-heating duration is sufficient to initiate an increase in the temperature within the abrasive preform 2301. In accordance with an embodiment, the pre-heating duration is not greater than about 30 seconds. In certain other embodiments, the pre-heating duration can be less, such as not greater than about 25 seconds, not greater than about 20 seconds, or even not greater than about 15 seconds. Some embodiments utilize a pre-heating duration within a range between about 1 second and about 15 seconds, and more particularly within a range between about 1 second and about 10 seconds.

Referring again to FIG. 6, after increasing the power of the beam at step 2109, the process continues by changing the position of the beam of electromagnetic radiation relative to the abrasive preform to braze the abrasive region at step 2111. In certain embodiments, the change in the position of the beam relative to the abrasive preform 2301 can be accomplished by moving the abrasive preform 2301 and holding the beam in a stationary position. Alternatively, the beam can be moved while the abrasive preform 2301 is held in a stationary position. In still another embodiment, the beam and the abrasive preform 2301 can both be moved, such as in opposite directions.

Referring again to FIG. 8, during the process of changing the position of the beam, the radiation zone 2303 is moved from the starting location 2305 to a scanning location 2307 to effect brazing of the abrasive region 2302. The change in position of the beam can be completed in a manner such that there is a controlled scanning rate and thus resulting in portions along the length of the abrasive region 2302 to receive substantially the same amount of energy facilitating a uniform brazing operation. As such, in accordance with one embodiment, scanning can be conducted at a scanning rate of at least about 1 mm/sec. In other embodiments, the scanning rate may be greater such as at least about 2 mm/sec, 4 mm/sec, 6 mm/sec, or even 8 mm/sec. In one certain embodiment, the scanning rate is within a range between about 1 mm/sec and 10 mm/sec, and more particularly within a range between about 1 mm/sec and about 6 mm/sec.

Referring again to FIG. 6, after changing the position of the beam at step 2111 the process continues at step 2113 by changing the position of the beam of electromagnetic radiation until the beam is directed at a stopping location. Referring again to the plot of FIG. 8, the beam is illustrated at a stopping location 2309 at and end of the abrasive region 2301 opposite of the starting location 2305, such that the beam has impinged upon each position along the length of the abrasive region 2301 during the brazing procedure. According to one embodiment, upon reaching the stopping location 2309 the power of the beam can be changed. In particular, the power of the beam can be decreased from a scanning power 2312 to a stopping power 2318. Decreasing the power reduces the potential for thermal damage to the bonding layer and abrasive grains by avoiding rapid cooling and produces a more uniform braze. In accordance with a particular embodiment, the decrease in the power can be such that the beam is decreased by at least about 10% of the scanning power 2312. In accordance with other embodiments the decrease in power may be greater, such as on the order of at least about 20%, at least 50%, 75%, or even at least about 90% of the scanning power 2312. In one particular embodiment, the power can be returned to the same power used at the starting location 2305 (i.e., the pre-heating power 2310).

Additionally, the duration for reducing the power of the beam from a scanning power 2312 to a stopping power 2318 can be less than about 20 seconds. For example, in certain embodiments the duration can be not greater than about 15 seconds, such as not greater than about 10 seconds, or even not greater than about 5 seconds. In particular embodiments, duration for reducing the power at the stopping location 2309 can be within a range between about 1 second and about 20 seconds.

In accordance with another embodiment, the brazing process described in accordance with the flow chart of FIG. 6 can be conducted in an inert environment, such that the abrasive preform is placed within an enclosure or chamber having a substantially inert environment. For example, in accordance with one embodiment the abrasive preform can be contained within an enclosure wherein the ambient atmosphere is purged and filled with an inert environment, such as a noble gas, for example argon. In accordance with other embodiments, the abrasive preform can be contained within an enclosure, which may not be sealed, however an inert gas is flowed into the enclosure and over the surface of the abrasive preform during the brazing operation to avoid oxidation of the components.

Figure 9A:
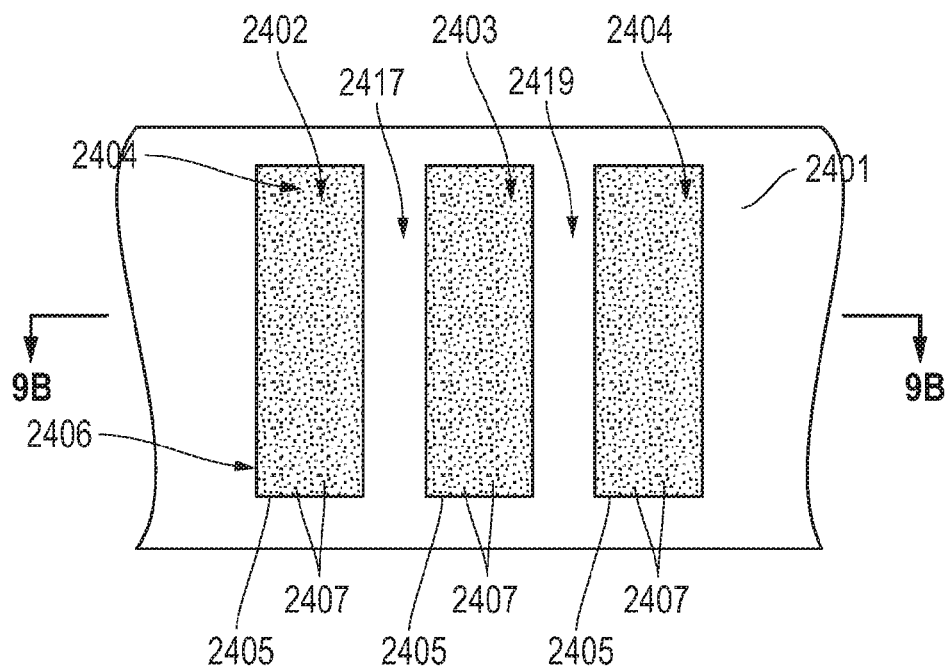
FIG. 9A includes a top view of a portion of a single-layered abrasive article in accordance with an embodiment.

FIG. 9A includes a top view of a single-layered abrasive article in accordance with an embodiment. As illustrated, the single-layered abrasive article includes a substrate 2401 and abrasive regions 2402, 2403, and 2404 (402-404) overlying the substrate 2401. The abrasive regions 2402-2404 include a bonding layer 2405 and abrasive grains 2407 contained within the bonding layer in accordance with embodiments. Additionally, the abrasive regions 2402-2404 are adjacent and spaced apart from each other by non-abrasive regions 2417 and 2419 which do not contain the bonding layer 2405 and abrasive grains 2407. In particular, the spacing between the abrasive regions 2402-2404 allows for individual brazing of each of the abrasive regions 2402-2404. For example, during a brazing process, the beam of electromagnetic radiation could be directed at location 2404 on abrasive portion 2402 and directed across the length of the abrasive region 2402 until the beam had passed over the full length, stopping at location 2406, to effect brazing of the abrasive region 2402.

Such a process can be repeated individually for each of the abrasive regions 2403 and 2404. Notably, the existence of the non-abrasive regions 2417 and 2419 separate the abrasive regions 2402-2404 from each other and facilitates individual brazing of each of the abrasive regions 2402-2404 thereby avoiding beam overlap and thermal damage to the abrasive regions 2402-2404 that have been previously brazed.

Figure 9B:
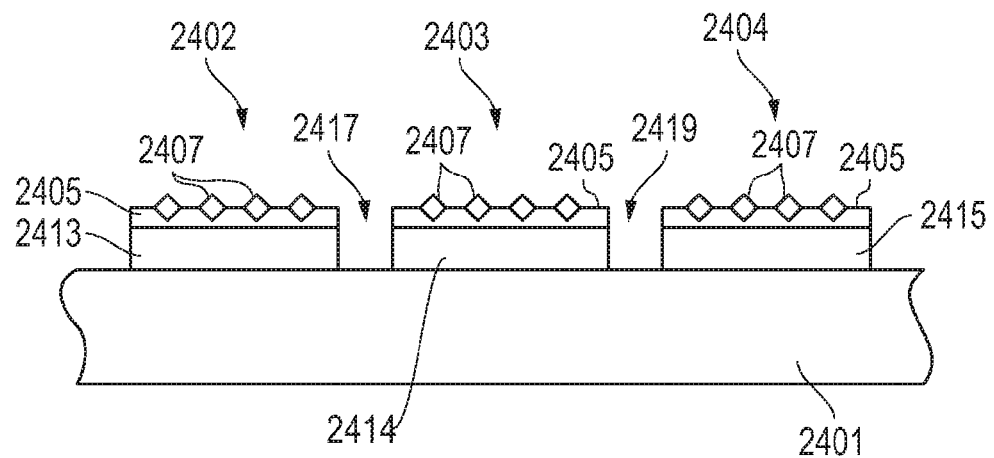
FIG. 9B includes a cross-sectional illustration of the portion of the single-layered abrasive article of FIG. 9A in accordance with an embodiment.

FIG. 9B includes a cross-sectional illustration of a portion of the single-layered abrasive article of FIG. 9A. Notably, FIG. 9B resembles the abrasive article of FIG. 3B described in other embodiments herein and has abrasive portions 2402-2404 formed on raised portions 2413, 2414, and 2415 (2413-2415) of the substrate 2401 and the non-abrasive regions 2417 and 2419 are channels between the raised portions 2417 and 2419. Formation of the raised portions 2413-2415 facilitates heat dissipation during the brazing process and avoids excessive thermal damage to the brazed regions, particularly in the context of high-power beams. The raised portions 2413-2415 define upper major surfaces extending above the lower major surface of the substrate 2401, that is, the upper surface of the substrate within the channels 2417 and 2419. As illustrated, the abrasive portions 2402-2404 are overlying the upper major surfaces of the raised portions 2413-2415, such that the bonding layer 2409 and abrasive grains 2407 in each of the abrasive portions 2402-2404 are disposed on top of the upper surfaces.

Figure 10:
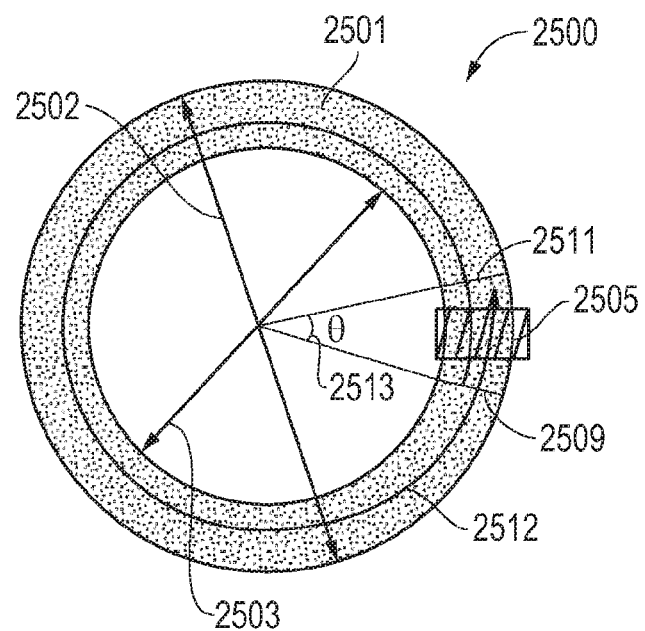
FIG. 10 includes a top view illustration of a single-layered abrasive article in accordance with an embodiment.

FIG. 10 includes an illustration of a single-layered abrasive article in accordance with an embodiment. In particular, FIG. 10 illustrates a single-layered abrasive article 2500 having an annular shape including an outer diameter 2502 and an inner diameter 2503, the same as illustrated in FIG. 3B. The brazing operation can be completed according to those procedures described in accordance with FIG. 6, with the exception that the starting location and stopping location can be the same location and thus not spaced apart. During the brazing procedure, the beam (or optionally the article 2500) can be rotated, such that the radiation zone 2505 travels through the circumference to effect brazing of the bonding layer and abrasive grains through the circumference of the article 2500.

According to certain embodiments, the processing procedures for such an article 2500 can be more involved. For example, the starting location 2509 and stopping location 2511 can be spaced apart such that during brazing the radiation zone 2505 of the beam travels through more than 360° of rotation as illustrated by path 2512. The amount of overlap designated by the angle 2513 is generally greater than about 5°. In certain embodiments, the angle 2513 is at least about 10° such as at least about 15°, and particularly within a range between about 5° and 20°.

Additionally, in such embodiments where the beam overlaps previously brazed regions, upon initiating the overlap, the power of the beam may be decreased to avoid thermal damage to previously brazed regions. For example, upon reaching the starting location 2509 a second time (i.e., after traveling 360°) the beam may continue to travel along the path 2512 while the power of the beam can be decreased. The power of the beam can be decreased in a manner as described previously according to embodiments herein.

Figure 11A:
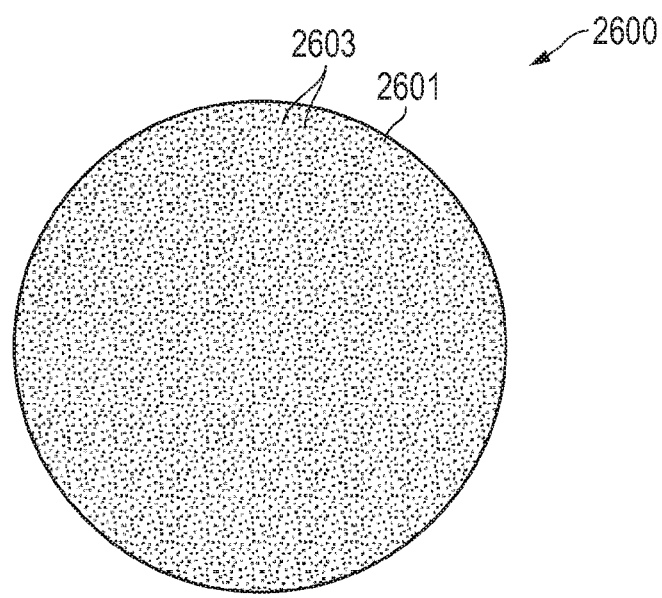
FIG. 11A includes a top view illustration of a single-layered abrasive article in accordance with an embodiment.

FIG. 11A includes a top view illustration of a single-layered abrasive article in accordance with an embodiment. In particular, FIG. 11A illustrates a single-layered abrasive button, which may be used in a plurality of applications, for example as part of a CMP pad conditioner. As illustrated, the button 2600 includes a bonding layer and a plurality of abrasive grains 2603 contained therein.

Figure 11B:
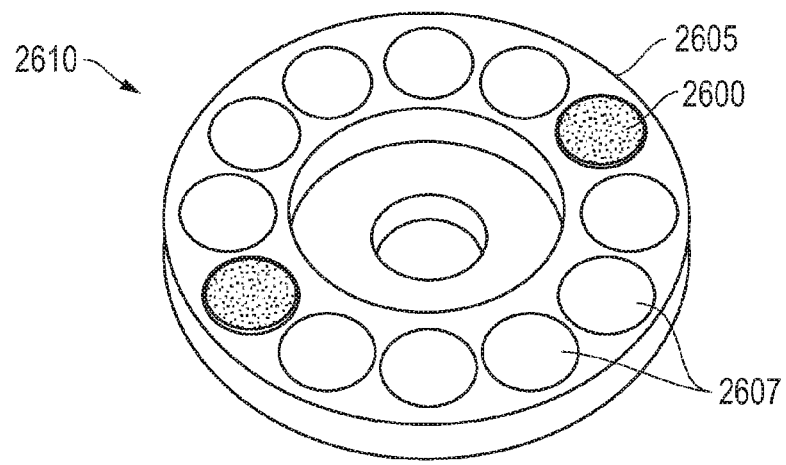
FIG. 11B includes a perspective illustration of a tool incorporating the single-layered abrasive article of FIG. 11A in accordance with an embodiment.

Referring to FIG. 11B, a perspective view of an abrasive tool incorporating the single-layered abrasive article of FIG. 11A is illustrated. In particular, the abrasive tool 2610 includes a housing 2605 having a plurality of openings 2607, each opening 2607 having a shape configured to engage and house a single-layered abrasive button 2600 therein. Such a tool may be particularly useful in CMP pad conditioning applications.

Figure 11C:
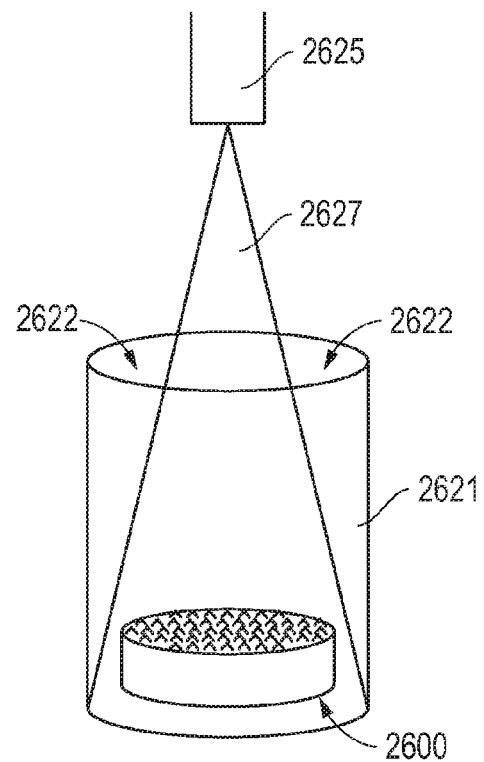
FIG. 11C includes a diagram illustrating a brazing process for forming the single-layered abrasive article of FIG. 11A in accordance with an embodiment.

FIG. 11C includes a diagram illustrating an alternative process for forming single-layered abrasive buttons in accordance with an embodiment. In particular, FIG. 11C illustrates a single-layered abrasive button 2600 contained within a sleeve 2621 wherein an inert gas 2622, such as argon, is pumped into the sleeve 2621. More particularly, unlike previously described embodiments, the beam 2627 of electromagnetic radiation is generated from a device 2625 (e.g., a laser) that is defined by a circular radiation zone. Notably, the device 2625 is a high-power device in accordance with devices described herein using a power of at least about 800 W.

Additionally, the device 2625 is capable of providing a beam 2627 having a substantially uniform energy density across the radiation zone facilitating the formation of a brazed article having a substantially uniform braze. For example, in one embodiment, the device 2625 is a fiber laser capable of delivering a beam 2627 having a substantially uniform energy density.

As further illustrated, the radiation zone of the beam 2627 has a diameter greater than the diameter of the single-layered abrasive button 2600 such that portions of the beam 2627 do not impinge upon the abrasive surface of the button 2600. The difference in the area of the radiation zone versus the impingement area is the same as those described in accordance with other embodiments. As such, the formation of such single-layered abrasive buttons 2600 using the configuration illustrated in FIG. 11C may not necessarily include movement of the button 2600 or the device 2625 generating the beam 2627, since the beam is capable of covering the entire area to be brazed within movement. Still, according to one embodiment, the brazing process still utilizes a pre-heating operation and an increase in the power of the beam after a pre-heating duration as described herein.

The brazing techniques described herein facilitate the formation of single-layered abrasive articles having certain features and characteristics that distinguish the articles from conventionally formed articles. For example, properties such as improved bond strength and bond strength uniformity of the bonding layer with respect to the abrasive grains, smaller diffusion layer between the bonding layer and the substrate, smaller bonding interface region between the bonding layer and the abrasive grains, and bonding layer thickness uniformity. Such properties result in improved abrasive characteristics, such as grinding performance, as will be demonstrated and discussed in the Examples herein.

The processes herein facilitate the formation of a single-layered abrasive article having a highly homogenous bonding layer having fine crystallite sizes within the final-formed bonding material. The formation of a bonding layer having such fine sizes results in a bonding layer having more uniform mechanical characteristics and thus better grit retention and abrasive characteristics. For example, in embodiments utilizing a bonding layer containing chromium, the bonding layer is a homogenous material having chromium-containing crystals of an average size of less than about 20 microns. In other embodiments, the chromium-containing crystals have a smaller average size, such as less than about 15 microns, less than about 10 microns, less than about 8 microns, or even less than about 5 microns. In accordance with a particular embodiment, the chromium-containing crystals are within a range between about 1 micron and about 10 microns.

In reference to other characteristics of the single-layered abrasive articles formed according to the processes disclosed herein, the size of the bonding interface region between the abrasive grains and the bonding layer has a reduced size. In particular, the bonding interface region has a reduced width resulting in abrasive grains and bonding layers that maintain their original chemical compositions as opposed to those articles having wider bonding interface regions indicating excess diffusion of chemical species between the abrasive grains and bonding layer, which degrades the performance characteristics of the tool in abrasive applications. In accordance with one embodiment, the bonding interface region has an average width of not greater than about 5 microns. In other embodiments, the average width of the bonding interface region can be less, such as not greater than about 4 microns, not greater than about 3 microns, or even not greater than about 2 microns. In accordance with a particular embodiment, the bonding interface region has an average width within a range between about 0.5 microns and about 5 microns, and more particularly within a range between about 1 micron and about 3 microns.

Figure 12A:
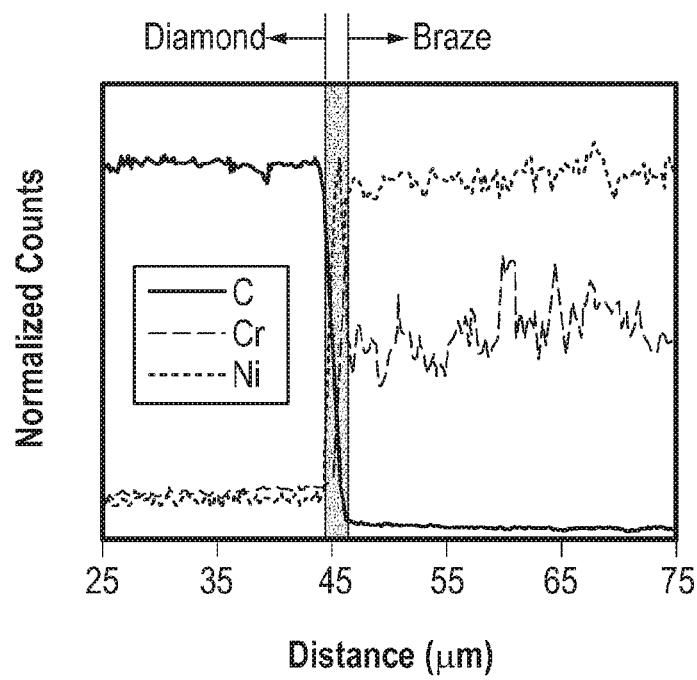
FIGS. 12A and 12B include plots of normalized counts versus distance at an interface between an abrasive grain and a bonding layer for a single-layered abrasive article formed by a laser brazing process and a single-layered abrasive article formed by a conventional induction furnace brazing process.
Figure 12B:
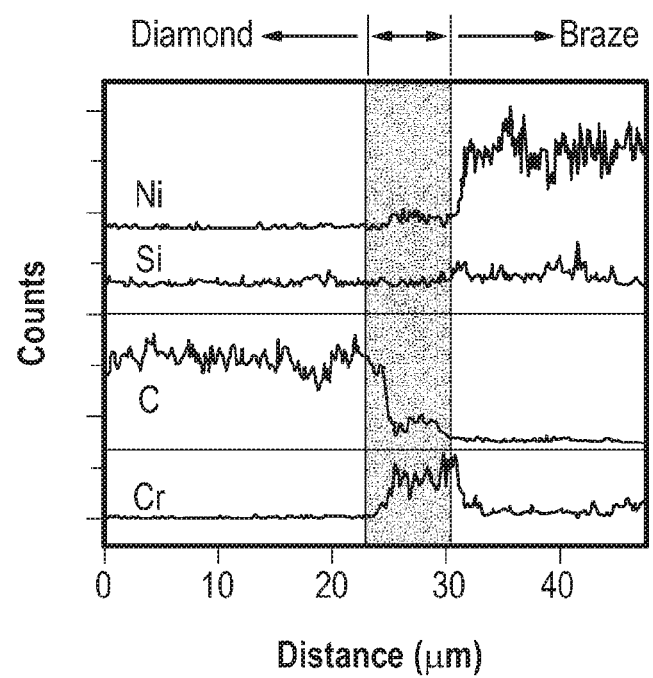

Turning briefly to FIGS. 12A and 12B, both include plots of normalized counts versus distance for portions of single-layered abrasive articles at the interface between the bonding layer and the substrate. The plot of FIG. 12A is for an abrasive article formed according to a brazing process using a beam of electromagnetic energy (i.e., a laser) and FIG. 12B is a plot for an abrasive article formed according to a furnace brazing process at an interface between an abrasive grain and a braze layer. (See, Xu et al., 2006 Material Science Forum). In particular, the plots illustrate the chemical components present at the interface between an abrasive grain and the bonding layer, and more particularly, the width of the bonding interface region. As can be seen in a comparison of the two processes, the brazing process using the laser results in a bonding interface region having a smaller width, indicating little diffusion between the chemical components of the abrasive grain and the bonding layer, and thus little change in the chemical compositions of the abrasive grain and bonding layer during the brazing process. The conventionally-formed abrasive article demonstrates greater diffusion of elements between the abrasive grains and bonding layer which may weaken the abrasive grain and bonding layer.

In accordance with another embodiment, the single-layered abrasive articles herein have an improved bond between the bonding layer and the substrate. Generally, during conventional brazing operations a diffusion layer is formed wherein chemical components of the bonding layer diffuse into the upper surface of the substrate forming a diffusion layer between the lower surface of the bonding layer and the upper surface of the substrate. Such a phenomenon results in leeching of certain chemical species into this diffusion layer thus changing the chemical composition of the bonding layer. In certain embodiments, the single-layered abrasive tools herein have a diffusion layer between the substrate and the bonding layer of reduced thickness, for example, not greater than about 8 microns. In other embodiments, the average thickness of the diffusion layer can be less, for example, the diffusion layer can have an average thickness of not greater than about 6 microns, not greater than about 5 microns, 3 microns, or even not greater than about 2 microns. Particular embodiments can have a diffusion layer that has an average thickness within a range between about 0.5 microns and about 5 microns.

In further reference to the bonding layer, processes described herein facilitate the formation of a bonding layer demonstrating superior hardness. The hardness of the bonding layer is an indication of its abrasive properties and the resistance to wear which directly impacts performance characteristics and grain retention. According to one embodiment, the average hardness of the bonding layer, as measured by a Vickers hardness test (on a Wilson Tukon microhardness tester under 50 g loads) is greater than about 700 HV, wherein HV is the Vickers Pyramid Number and 1 HV=9.8 MPa. In other embodiments, the average Vickers hardness of the bonding layer is greater, such as at least about 710 HV, 725 HV, 730 HV, or even at least about 750 HV. In particular instances, the average Vickers hardness of the bonding layer is within a range between about 700 HV and about 850 HV.

Additionally, the hardness uniformity of the bonding layer is improved over articles formed through conventional processes. For example, the bond uniformity as measured by the standard deviation of at least 5 Vickers hardness measurements taken over the surface of the bonding layer is not greater than about 100 HV. In other embodiments, the hardness uniformity is greater, such that the standard deviation is not greater than about 90 HV, not greater than about 75 HV, or even not greater than about 60 HV. Certain embodiments demonstrate a bond hardness uniformity within a range between about 25 HV and about 100 HV.

The processes herein also provide abrasive articles demonstrating improved grit retention as compared to abrasive articles formed through different processes. Grit retention can be measured by placing a steel pick at a 45° angle relative to a major surface of the substrate at the interface between the bonding layer and an abrasive grain. The force to dislodge or fracture the abrasive grain is measured as the grit retention value or otherwise the bond strength between the abrasive grain and the bonding layer. The bonding layer of the abrasive articles formed according to embodiments herein demonstrate improved grit retention, such that the average grit retention value is at least 8.5 lbs of force for a maximum test force of 10 lbs. Other embodiments demonstrate improved bond strength through greater average grit retention values, such as at least about 8.75 lbs, at least about 9 lbs, at least about 9.25 lbs, at least about 9.5 lbs, or even at least about 9.75 lbs for a maximum test force of 10 lbs.

In addition to the bond strength as demonstrated by the average grit retention values, the uniformity of the bond strength can be demonstrated by the standard deviation in the grit retention values measured for a maximum test force of 10 lbs. Abrasive articles formed according to embodiments herein demonstrate an improved uniformity in the bond strength. For example, the abrasive articles have a bond strength uniformity of not greater than about 2 lbs for at least 10 grit retention test values. In certain instances, the bond strength uniformity as measured by the standard deviation in the grit retention values is less, such as on the order of not greater than about 1.75 lbs, not greater than about 1.5 lbs, not greater than about 1.25 lbs, or even not greater than about 1 lbs. In one embodiment, the bond strength uniformity is within a range between about 0.1 lbs and about 1.25 lbs. It will be appreciated that because the maximum test for was 10 lbs, the low standard deviation not only indicates good bond strength uniformity but improved bond strength, since the grit retention values likely exceeded the maximum 10 lbs of force.

The processes and features disclosed herein facilitate the formation of abrasive tools having abrasive regions, defined by the bonding layer and abrasive grains, that are larger in area than previously formed with other similar processes. Notably, the abrasive tools herein can have abrasive regions widths (see, for example, dimension 2208 of FIG. 7, which corresponds to the width of the abrasive region 2202) that are greater than about 3 mm. In other instances, the width can be greater, such as greater than about 5 mm, greater than about 10 mm, greater than about 15 mm. Some embodiments have a width that is within a range between about 5 mm and about 20 mm.

Figure 13A:
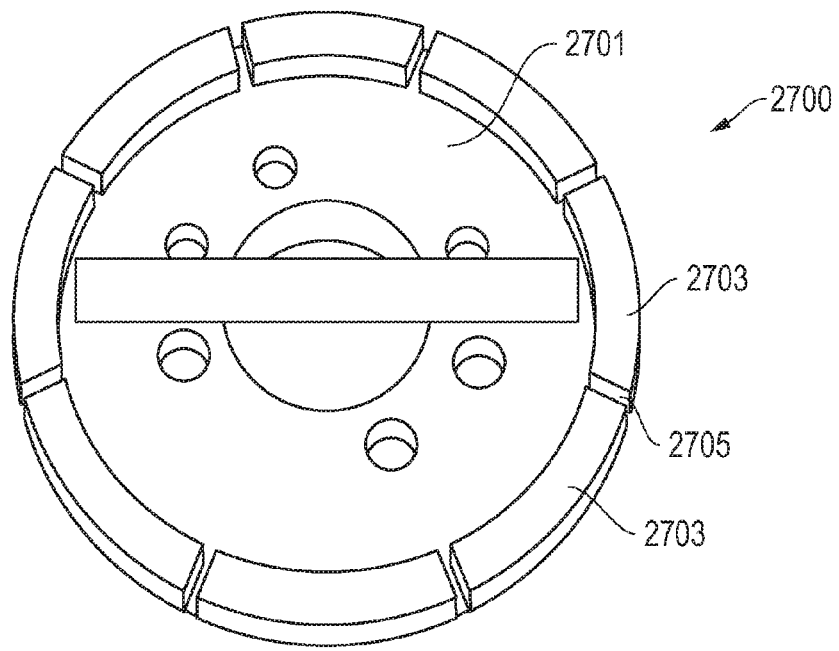
FIGS. 13A-13E include illustrations of abrasive tools incorporating a single-layered abrasive article in accordance with an embodiment.

FIGS. 13A through 13E illustrate single-layered abrasive articles formed according to the processes described herein and having certain characteristics described herein. FIG. 13A includes a perspective view of a single-layered abrasive article in accordance with an embodiment. In particular, the single-layered abrasive article 2700 is a segmented abrasive tool having abrasive regions 2703 including the bonding layer and a single layer of abrasive grains separated by a non-abrasive region 2705. In particular, the nonabrasive region 2705 can be a channel, which may facilitate heat dissipation and over brazing of adjacent abrasive regions during the processing. The single-layered abrasive article 2700 can be used as a segmented a cutting tool or edge grinding tool.

Figure 13B:
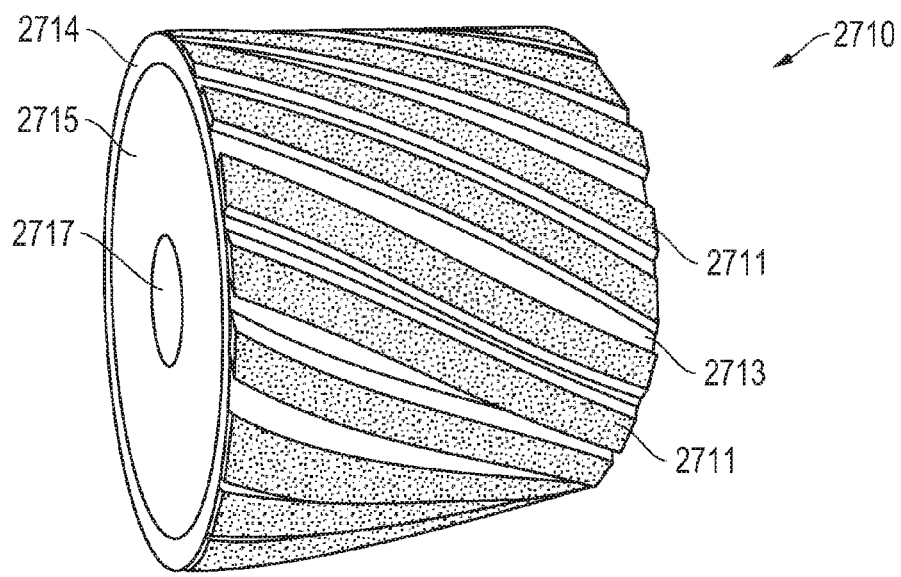

FIG. 13B includes a perspective view of a tool incorporating a single-layered abrasive article in accordance with an embodiment. In particular, the tool 2710 has a cylindrical housing 2715 including an opening 2717 extending longitudinally through the interior of the housing and configured to attach to another tool, such as the output shaft of a hand-held tool. The tool 2710 includes a single-layered abrasive article 2714 bonded to the periphery of the cylindrical housing 2715 and having abrasive regions extending in a partial helical pattern around the periphery of the housing 2715. In particular, the abrasive regions 2711 are separated by non-abrasive regions 2713, which may be in the form of channels. The tool 2710 can be used in grinding applications and may be used for grinding surfaces, edges, corners and the like of various workpieces.

As will be appreciated, formation of the tool 2710 can include the formation of the single-layered abrasive article apart from the housing 2715. For example, the single-layered abrasive article 2714 can be formed on a substrate that is then coupled or adhered to the housing 2715 as shown. Such a forming method may allow for formation of the abrasive regions while the substrate that is laid flat during the brazing process, and then bent or formed around the periphery of the housing 2715 after completing the brazing process.

Figure 13C:
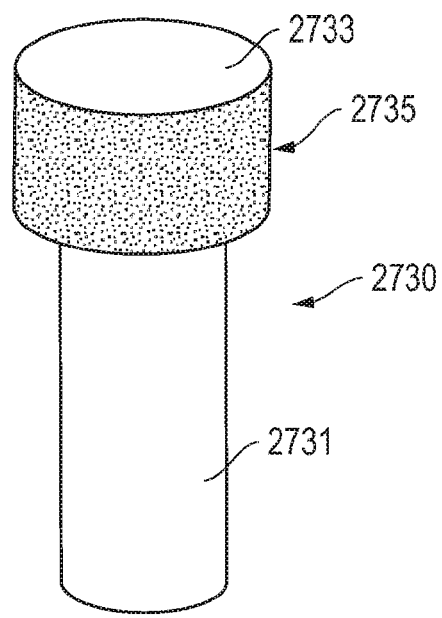

FIG. 13C includes an illustration an abrasive tool incorporating a single-layered abrasive in accordance with embodiments herein. Notably, the abrasive tool 2730 includes a handle 2731 connected to a housing 2733 that incorporates a single-layered abrasive article 2735 extending around the periphery of the cylindrically-shaped housing 2733. Such a tool 2730 may also be used in grinding applications on various workpieces.

Unlike the tool 2710 of FIG. 13B, the single-layered abrasive article 2735 can be formed on the tool as illustrated. For example, the periphery of the housing 2733 can be coated with a bonding material and a single layer of abrasive grains can be applied, and after which, a beam of electromagnetic radiation can travel over the periphery of the housing 2733 completing a brazing process as described according to embodiments herein.

Figure 13D:
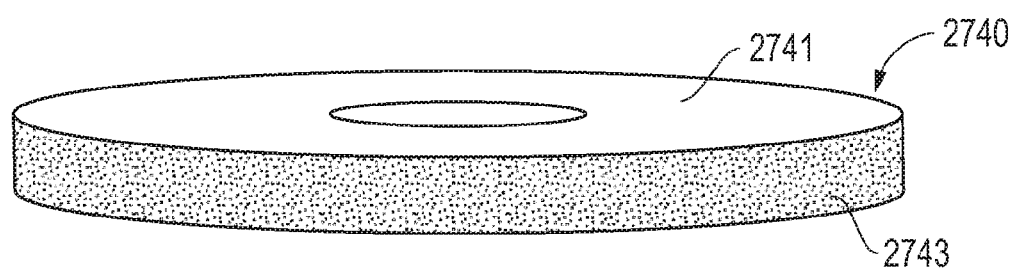

FIG. 13D includes a perspective view of another abrasive tool incorporating a single-layered abrasive in accordance with embodiments herein. As illustrated, the tool 2740 can include a substrate 2741 having a disc shape defined by two major surfaces and a side surface joining the two major surfaces. In particular, the tool 2743 includes a single-layered abrasive article 2743 having a bonding layer and a single layer of abrasive grains therein in accordance with embodiments herein. Notably, the single-layered abrasive article 2743 is disposed around the side surface of the substrate 2741, making the tool 2740 suitable for edge grinding applications.

Figure 13E:
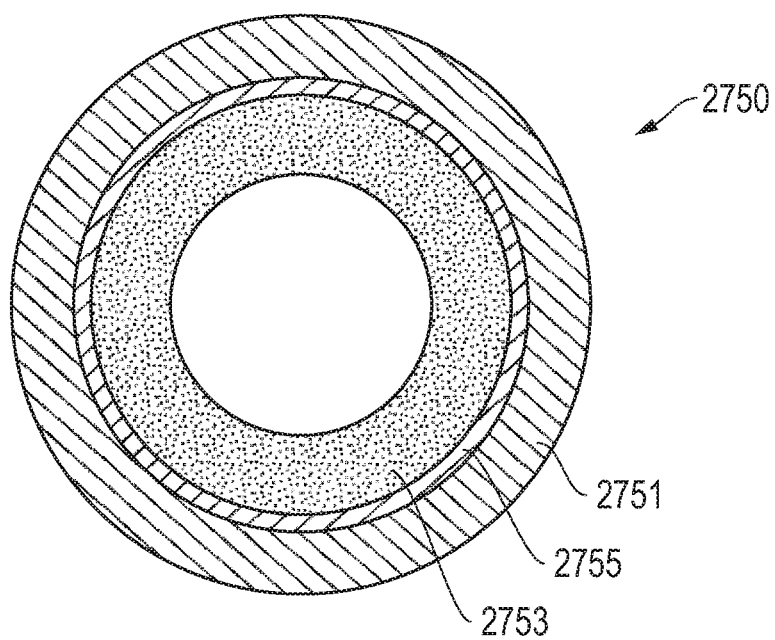

FIG. 13E includes a top view of a single-layered abrasive tool in accordance with an embodiment. In particular, the single-layered abrasive tool 2750 includes an annular shaped substrate, which incorporates two different types of abrasive regions. In particular, the abrasive region 2751 can include a first type of abrasive grain, such as having a particular size and shape that is different than the abrasive grains incorporated with region 2753. As further illustrated, the abrasive region 2751 is separated from the abrasive region 2753 by a nonabrasive region 2755, such as a channel. As described herein, the existence of the nonabrasive region 2755 facilitates the formation of the single-layered abrasive tool 2715 in accordance with the processes described herein.

EXAMPLES

The following examples illustrate differences in certain features between a single-layered abrasive article formed in accordance with the embodiments herein compared to conventionally-formed single-layered abrasive articles, such as brazing in a furnace or alternatively, or certain laser-brazing processes.

Example 2A

In reference to samples formed according to embodiments herein, a 304 stainless steel substrate was provided, a bonding layer material (i.e., braze material) containing nickel and chrome commonly available from the Wall Colmonoy Corporation as Nicrobraz™ was applied as a paste to a surface of the steel substrate, and a single layer of abrasive grains having an average grit size of 250 μm were placed in a random distribution within the bonding layer paste. A diode laser available from Nuvonyx Company commonly available as ISL-4000L™ was used to conduct the brazing operation. The laser defined a radiation zone having a size of 6 mm in width and 15 mm in length. The laser was operated as described herein, particularly using a pre-heating power of 1000 W and a scanning power of 1900 W. Scanning was conducted at a rate of 2 mm/s across the abrasive region containing the bonding layer and abrasive grains.

Other samples were formed according to a conventional furnace brazing process in which the samples were made using the same substrate, braze material, and grit as described above. The brazing process was conducted in a furnace at a brazing temperature of 1020° C., which was held for a duration of 20 minutes before the samples were cooled to room temperature.

Figure 14A:
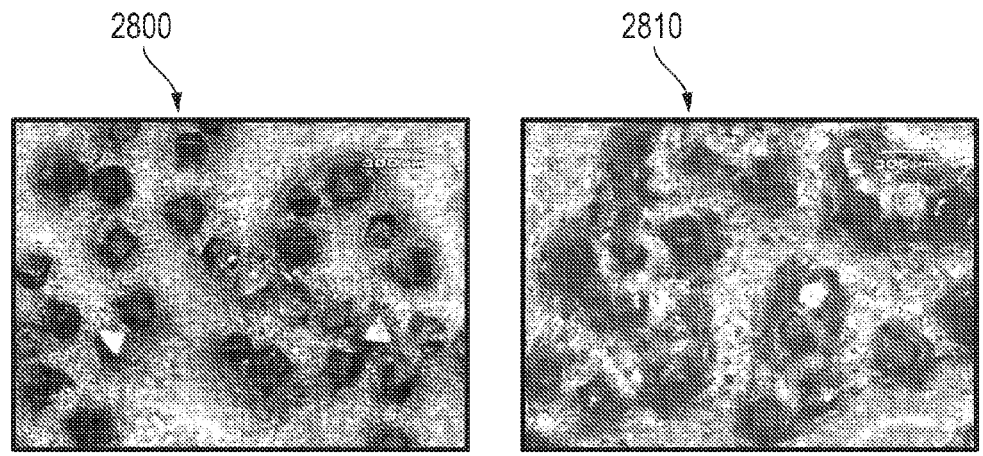
FIG. 14A includes two images of portions of single-layered abrasive articles, a first formed according to a conventional technique, and a second formed according to a brazing technique in accordance with an embodiment.

FIG. 14A includes two images of portions of single-layered abrasive articles, a first formed according to the conventional technique and a second formed according to the brazing technique described above. In particular, image 2800 provides a magnified view of a surface of a single-layered abrasive tool formed according to the embodiments herein, and image 2810 is a magnified view of a portion of the single-layered abrasive tool formed according to the conventional technique. Image 2800 illustrates a highly homogenous bonding layer and good grit exposure of each of the abrasive grains. By contrast, image 2810 of the conventionally-formed article demonstrates a less homogenous bonding layer, poorer grit exposure, and greater discoloration around the abrasive grains indicating a substantial degree of diffusion between the abrasive grains and the bonding layer, a common phenomena associated with long durations of heat treatment used in furnace brazing. Notably, the diffusion of species between the abrasive grains and bonding layer is reduced for the sample of image 2800 due to the shortened heat treatment durations available through brazing with electromagnetic energy.

Figure 14B:
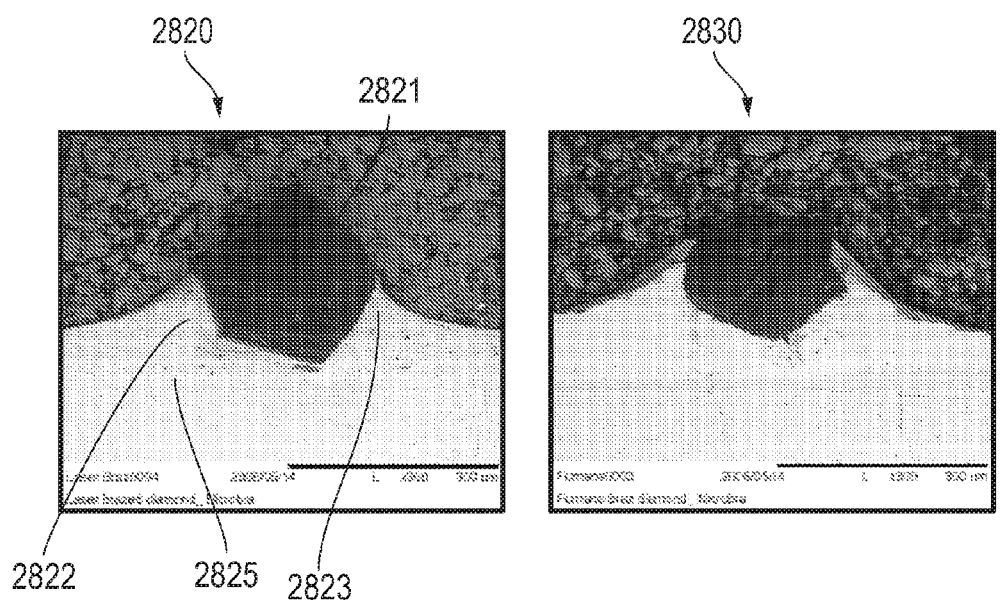
FIG. 14B includes two images of portions of single-layered abrasive articles, a first formed according to a conventional technique, and a second formed according to a brazing technique in accordance with an embodiment.

FIG. 14B includes two images of portions of single-layered abrasive articles, a first formed according to the conventional technique, and a second formed according to the brazing technique described above. Image 2820 provides a cross-sectional view of a grit and bonding layer that have been formed according to embodiments herein, while image 2830 provides a cross-sectional view of a grit and bonding layer formed according the conventional technique. In particular, the abrasive grain 2821 of image 2820 is illustrated as having a greater volume of exposure above the bonding layer 2825 as compared to the grain pictured in image 2830. Moreover, in a comparison between the images 2820 and 2830, the bonding layer 2825 illustrates improved wetting of the sides of the abrasive grain 2821 within regions 2822 and 2823.

Figure 15:
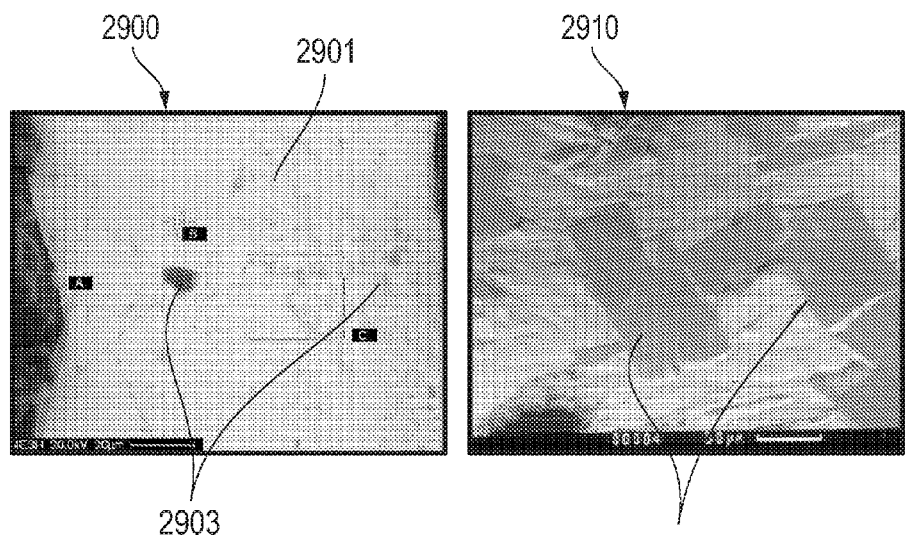
FIG. 15 includes two images of portions of single-layered abrasive articles, a first formed according to a conventional technique, and a second formed according to a brazing technique in accordance with an embodiment.

FIG. 15 includes two images of portions of single-layered abrasive articles, a first formed according to the conventional technique noted above, and a second formed according to the brazing technique described herein. Image 2900 illustrates a magnified portion of a single-layered abrasive article formed according to embodiments herein, and image 2910 illustrates a magnified portion of a single-layered abrasive article formed according to the conventional technique. In a comparison of the images 2900 and 2910, the bonding layer 2901 illustrates chromium-containing crystals 2903 that are present within the bonding layer 2901 and significantly smaller than the chromium-containing crystals 2913 illustrated in image 2910. In fact, the chromium-containing crystals within the sample of image 2900 have an average size less than 20 microns, while the chromium-containing crystals within the sample of image 2910 are greater than 30 microns in length and some even greater than 50 microns. The presence of such chromium-containing crystals indicates selective crystallization of certain materials from the bonding layer and the creation of grain boundaries, which changes the chemistry of the bonding layer and likely reduces the mechanical characteristics of the bonding layer. In short, the bonding layer 2901 demonstrates improved homogeneity, having smaller chromium-containing crystals 2903 resulting in improved abrasive grit retention and more uniform performance properties.

Figure 16:
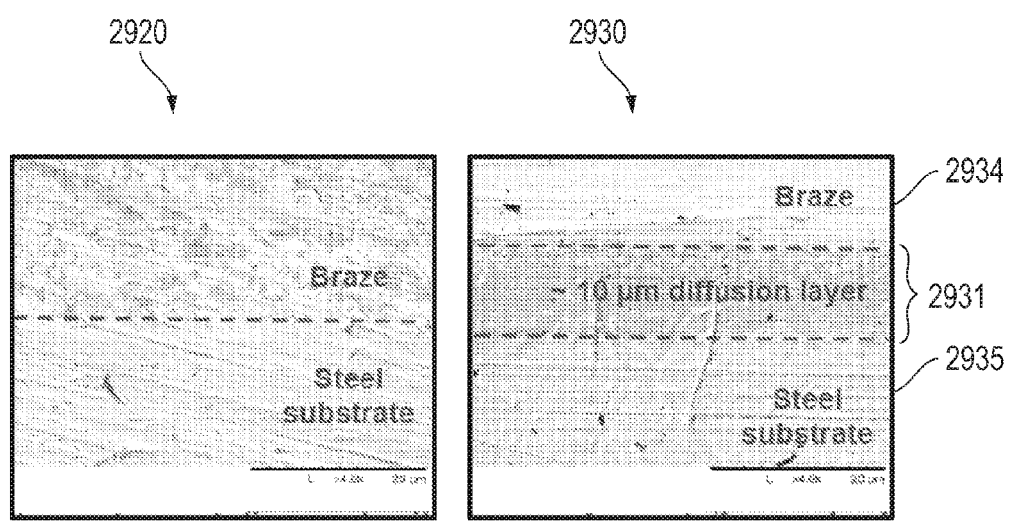
FIG. 16 includes two images of portions of single-layered abrasive articles, a first formed according to a conventional technique, and a second formed according to a brazing technique in accordance with an embodiment.

FIG. 16 includes two images of portions of single-layered abrasive articles, a first formed according to the conventional technique, and a second formed according to the brazing technique described herein. In particular, image 2920 illustrates a magnified portion of a single-layered abrasive article formed according to present embodiments, while image 2930 illustrates a portion of a single-layered abrasive article formed according to the conventional technique. In particular, the conventionally-formed abrasive article includes a well-defined diffusion layer 2931 disposed between the braze layer 2934 and steel substrate 2935 having an average thickness of about 10 microns. The presence of such a diffusion layer is an indication that certain species of the braze layer and steel substrate have to fused together thus changing the chemical composition of the braze layer 2934 and changing its performance characteristics. By comparison, the single-layered abrasive article of image 2920 demonstrates little or no diffusion layer between the braze layer and steel substrate thus indicating little to no change in the composition of the braze layer or its performance characteristics.

Figure 17:
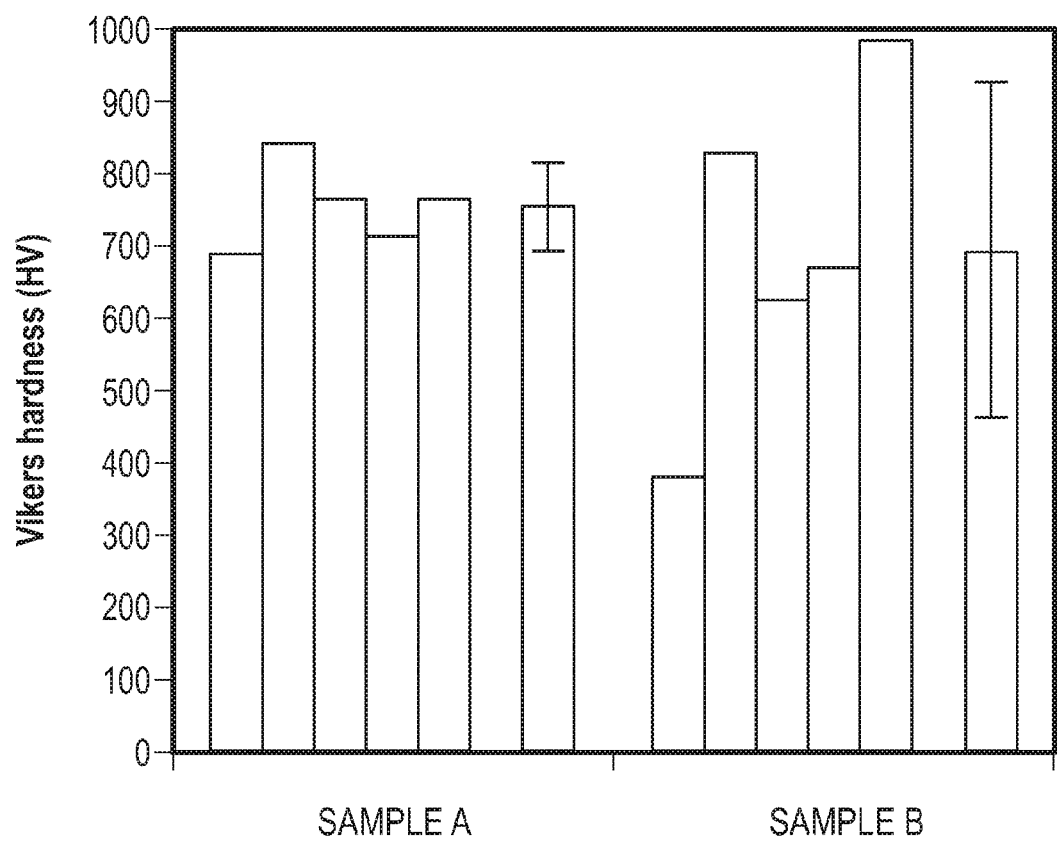
FIG. 17 includes a plot of hardness of a bond material for two single-layered abrasive articles, a first formed according to a conventional technique, and a second formed according to a brazing technique in accordance with an embodiment.

FIG. 17 includes plots of hardness values of a bonding layer for two single-layered abrasive articles, a first formed according to the conventional technique, and a second formed according to the brazing technique described herein. The data used to form plots of FIG. 17 are provided in Table 2. Sample 2A was formed according to embodiments disclosed herein for a bonding layer comprising nickel and chromium as described above. Sample 2B was formed from the same bonding layer material according to the conventional techniques described above.

TABLE 2

| Measurement | Sample 2A (HV) | Sample 2B (HV) |
|---|---|---|
| 1 | 689 | 376 |
| 2 | 841 | 825 |
| 3 | 766 | 623 |
| 4 | 713 | 666 |
| 5 | 766 | 985 |
| Average | 755 | 695 |
| Standard Deviation | 59 | 228 |

The measured Vickers hardness values (provided in Table 2) were gathered using a Wilson Tukon microhardness tester under 50 g loads. Sample 2A demonstrates a greater average Vickers hardness exceeding 700 HV and a narrower standard deviation in the measured hardness than the conventionally-formed sample (Sample 2B) thus indicating greater uniformity in hardness throughout the bonding layer. The hardness of the bonding layer of Sample 2B is lower and has a greater standard deviation demonstrating the lack of uniformity in the hardness. It will be appreciated a bonding layer having a greater average hardness and greater hardness uniformity results in an abrasive tool capable of withstanding greater mechanical stresses, better performance, and improved lifetime.

Example 2B

Figure 18:
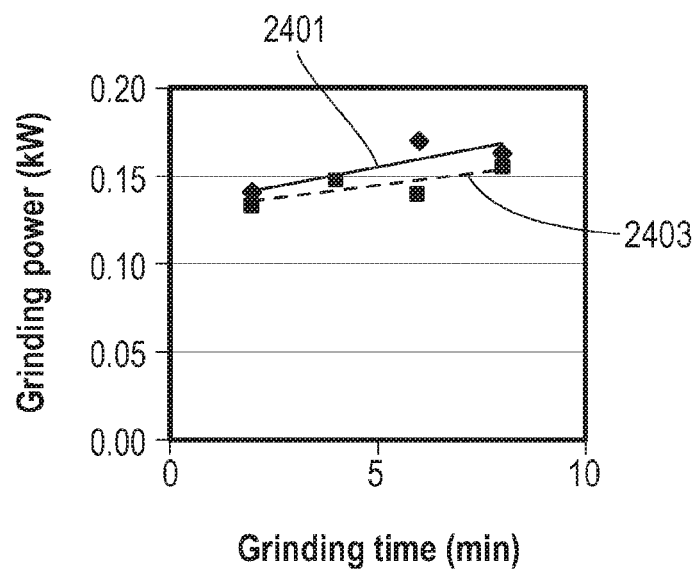
FIG. 18 includes a plot of grinding power versus grinding time for two single-layered abrasive samples, a first formed according to a conventional technique, and a second formed according to a brazing technique in accordance with an embodiment.
Figure 19:
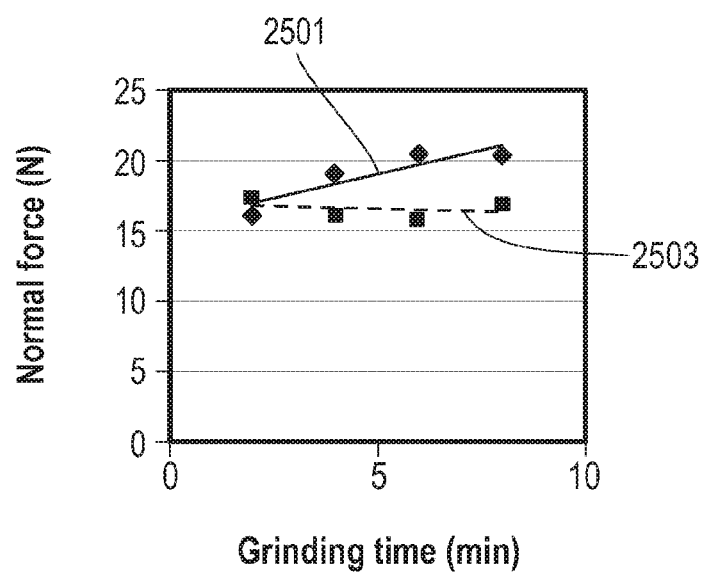
FIG. 19 includes of forced normal versus grinding time for two single-layered abrasive samples, a first formed according to a conventional technique, and a second formed according to a brazing technique in accordance with an embodiment.

FIGS. 18 and 19 demonstrate grinding characteristics for two samples, a single-layered abrasive article formed according to the conventional technique (Sample 2B), and a second single-layered abrasive button formed according to processes described herein (Sample 2A). The samples herein included the same substrate, bonding layer, and abrasive grain materials as used in Example 2B. In particular, the single-layered abrasive button formed according processes described herein were formed using a fiber laser available from IPG Photonics Corporation commonly available as YLR HP Series. The brazing process included using a beam having a 22 mm circular radiation zone, which was significant enough to encompass the entire abrasive region of the sample. The laser was held stationary over the abrasive region for 10 seconds at a power of 2800 W. The braze material was Nicrobraz™ commonly available from the Wall Colmonoy Corporation. The conventional sample was formed according to the furnace brazing process described for the conventional sample of Example 2B.

With respect to FIG. 18, a plot of grinding power versus grinding time is illustrated for the two samples. As illustrated by the plots, Sample 2B is represented by plot 2401 and demonstrates a greater increase in the required grinding power with increasing grinding time than that of the Sample 2A, formed according to processes herein and represented by plot 2403. Sample 2A demonstrates more efficient grinding since the grinding power necessary to carry out grinding does not increase at as great a rate per unit of grinding time as that of the conventional sample.

With respect to FIG. 19, a plot illustrating the normal force versus grinding time is provided for the two samples, Sample 2B is represented by plot 2501 and Sample A formed according to embodiments herein represented by plot 2503. As illustrated, the normal force applied during the grinding operation of Sample 2B increased with the grinding time for plot 2501 demonstrating a reduction in the grinding capabilities of the conventionally formed abrasive. By contrast, Sample 2A illustrates a substantially constant normal force required with increased grinding time demonstrating significantly little to no change in the grinding capabilities with increasing grinding time.

Example 2C

The following examples provide further details and comparisons between abrasive articles formed according to the embodiments herein and abrasive articles formed according to other laser brazing techniques. Table 3 below provides information on grit retention tests conducted on four samples. Sample 2A was formed according to the embodiments described herein, beginning with a steel substrate, a layer of braze material containing nickel and chrome commonly available from the Wall Colmonoy Corporation as Nicrobraz™ was applied as a paste to a surface of the steel substrate, and a single-layer of diamond grit (D251) having an average grit size of 250 μm were placed in a random distribution within the bonding layer paste. A diode laser available from Nuvonyx Company commonly available as ISL-4000L™ was used to conduct the brazing operation. The laser defined a radiation zone having a size of 6 mm in width and 16 mm in length. The laser was operated as described herein, particularly using a pre-heating power of 1400 W and a scanning power of 2300 W. Scanning was conducted at a rate of 3.2 mm/s across the abrasive region containing the bonding layer and abrasive grains.

Sample 2B was formed according to embodiments herein, including the use of a steel substrate, a braze containing Cu, Sn and Tih$_2$ applied as a paste to a surface of the substrate. A single layer of diamond grit (D251) was applied to the braze material and a fiber laser commonly available as YLR HP Series laser from IPG Photonics Corporation was used to conduct the brazing operation. The laser included a 22 mm diameter beam within the radiation zone used to form an abrasive button type article and was held stationary over the target at 1900 W for 10 seconds.

Sample 2C was formed according to the processing parameters disclosed in "Laser Brazing of Diamond Grits with a Ni-based Brazing Alloy", Yang et al., Key Engineering Materials, Vols. 359-360 (2008) pp. 43-47. Notably, Sample C included the same braze material as that of Sample 2A, and an average diamond grit size of 425 μm (D425). According to the parameters disclosed in the reference above, a $CO_2$ laser having a 3 mm diameter beam was used at 800 W and scanned at a rate of 10 mm/s.

Sample 2D was formed according to the processing parameters disclosed in "High Powered $CO_2$ Laser Brazing of Diamond Grits", Yang et al., Chinese Journal of Lasers, April 2007, Vol. 34, No. 4. Sample 2D included the same braze material as Sample B and an average diamond grit size of 425 μm. According to the parameters disclosed in the reference above, a $CO_2$ laser having a 3 mm diameter beam was used at 800 W and scanned across the abrasive region containing the abrasive grains and braze material at a rate of 8.39 mm/s.

All of the samples above were formed such that the braze layer was applied to the portion of the substrate in a manner to provide a layer having a substantially uniform thickness for proper formation of a bonding layer. Generally, Samples 2A and 2B demonstrated average bonding layer thicknesses of about 150 microns. As will be demonstrated in the data and pictures below, the processing parameters of the references noted above used to form Samples 2C and 2D did not enable the formation of a bonding layer having a uniform thickness.

Table 3 below demonstrates the differences in the bond strength of the bonding layer based on grit retention tests. The grit retention tests were carried out using a steel pick, placed at an interface between an abrasive grain and the bonding layer under a microscope at an angle of 45° relative to the surface of the substrate. Incrementally increasing loads were applied to steel pick to determine the load under which the abrasive grain is dislodged from the bonding layer or the abrasive grain is fractured. The force at which dislodging or fracturing occurs is recorded as the grit retention force.

TABLE 3

| Measurement | Sample 2A | Sample 2B | Sample 2C | Sample 2D |
|---|---|---|---|---|
| 1 | 10 | 10 | 1 | 4.9 |
| 2 | 10 | 10 | 1.9 | 5.8 |
| 3 | 10 | 10 | 1.5 | 10 |
| 4 | 10 | 10 | 0.8 | 10 |
| 5 | 10 | 10 | 1.6 | 10 |
| 6 | 10 | 10 | 1.4 | 8.9 |
| 7 | 10 | 6.9 | 0.8 | 9.6 |
| 8 | 10 | 10 | 1.8 | 10 |
| 9 | 10 | 10 | 1 | 10 |
| 10 | 10 | 10 | 1.1 | 5.4 |
| 11 | 10 | 9.2 | 1.9 | 10 |
| 12 | 10 | 10 | 1.1 | 6.2 |
| 13 | 10 | 8.7 | 0.9 | 4.6 |
| 14 | 10 | 10 | 1.5 | 8.4 |
| 15 | 10 | 7.3 | 0.8 | 10 |
| 16 | 10 | 10 | 1.2 | 10 |
| 17 | 10 | 10 | 1.8 | 7.2 |
| 18 | 10 | 10 | 1.3 | 10 |
| 19 | 10 | 8.6 | 0.7 | 10 |
| 20 | 10 | 10 | 1.1 | 6.7 |
| Average | 10 | 9.54 | 1.26 | 8.39 |
| Standard Deviation | 0 | 0.94 | 0.39 | 2.04 |

As demonstrated by the data in Table 3, Samples 2A and 2B formed according to embodiments herein demonstrate a greater bond strength as indicated by the average grit retention force as compared to Samples 2C and 2D formed according to other laser brazing processes. In fact, Samples 2A and 2B had a bond strength that was vastly superior to that of Sample 2C and clearly improved over the average grit retention force of Sample 2D. Moreover, Samples 2A and 2B further demonstrated superior bond strength uniformity as indicated by the small standard deviations in the 20 measurements taken, indicating a high degree of bond strength uniformity. Such bond strength uniformity can be attributed in part to the lessened diffusion of species between the abrasive grains and the braze material during forming resulting in a greater compositional homogeneity of the bond composition. It is noteworthy that Sample 2D did demonstrate greater bond strength than Sample 2C, however, the uniformity in the bond strength of Sample 2D was inferior to all samples.

Figure 20:
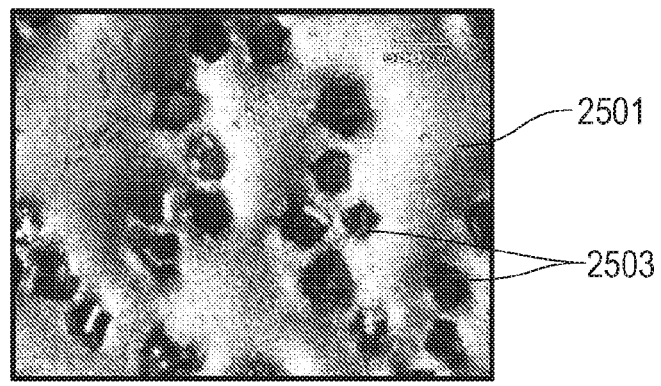
FIGS. 20-23 include images of surfaces single-layered abrasive articles, two images including abrasive articles formed according to embodiments herein, and two image including portions of abrasive articles formed according to conventional laser brazing processes.

FIGS. 20 through 23 include images of the surfaces of the abrasive articles corresponding to Samples 2A-2D, respectively. As illustrated in FIG. 20, Sample 2A demonstrates abrasive grains 2503 that are uniformly distributed in the bonding layer 2501. Notably, the bonding layer 2501 has a uniform color and contour. That is, the forming process facilitates proper heating of the substrate and braze material resulting in proper wetting of the braze material on the substrate. Thus the final-formed bonding layer demonstrates a substantially uniform thickness across the abrasive region and improved bond strength and bond strength uniformity as indicated by the data of Table 3.

Figure 21:
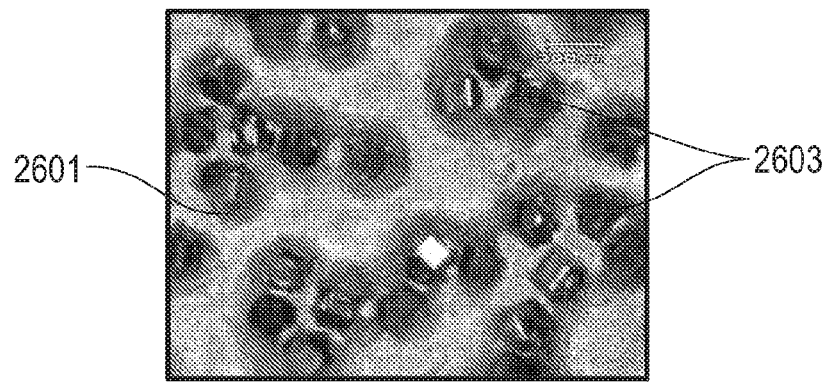

FIG. 21 corresponds to Sample 2B, which like Sample 2A, demonstrates abrasive grains 2603 uniformly distributed in the bonding layer 2601. Notably, the bonding layer 2601 has uniform color and contour. The bonding layer 2601 demonstrates good wetting of the surface of the substrate, thus enabling the formation of a bonding layer having a substantially uniform thickness, uniform color, and uniform grit dispersion and exposure of the grit. This is reflected in the grit retention values provided in Table 3.

Figure 22:
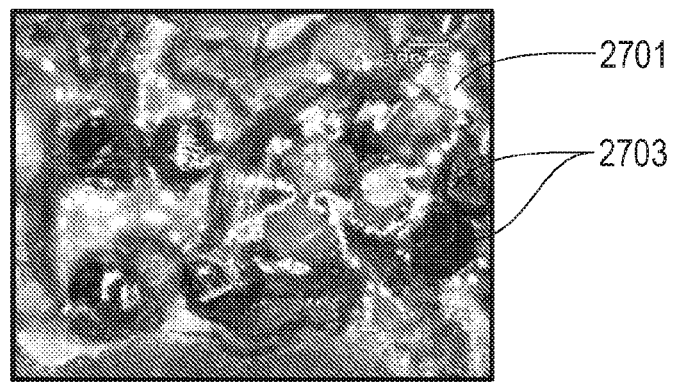

FIG. 22 includes an image of an abrasive portion from Sample 2C, including abrasive grains 2703 contained within the bonding layer 2701. As illustrated, the bonding layer 2701 is not uniform in color and is not uniform in contour. The bonding layer 2701 was not properly formed to provide adequate wetting of the substrate surface, and thus the bonding layer 2701 has poor uniformity in thickness and variations in grit exposure. The combination of processing parameters, including the scan speed and the power, type, and size of the laser were insufficient to form an abrasive article having a uniform bonding layer 2701 and proper grit exposure and distribution of abrasive grains 2703 within the bonding layer.

Figure 23:
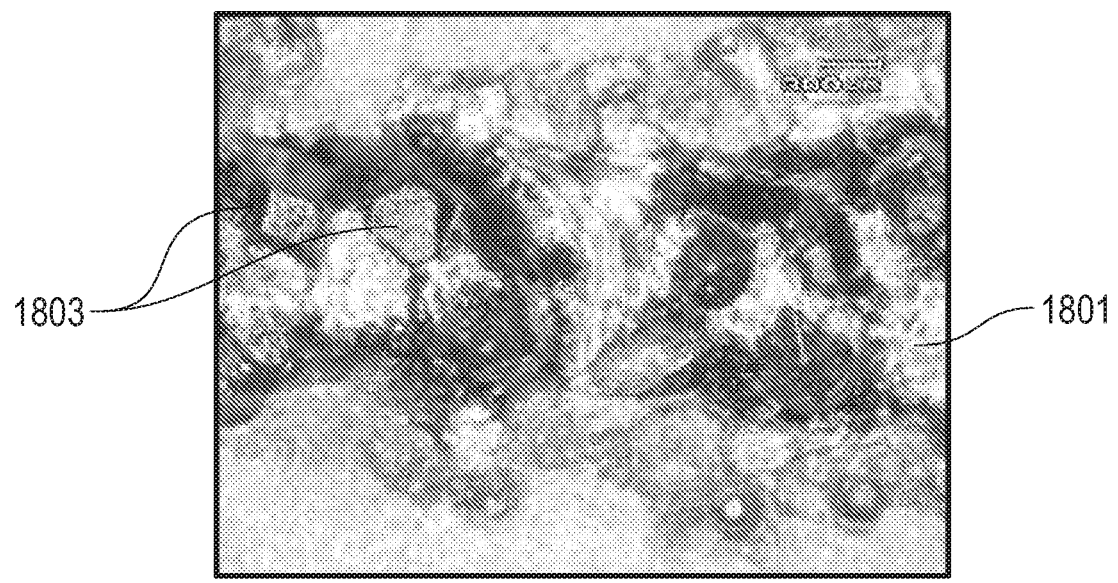

FIG. 23 includes an image of the abrasive portion from Sample 2D, including abrasive grains 2803 contained within the bonding layer 2801. Like Sample 2C, the bonding layer 2801 is not uniform in color or contour, demonstrating poor formation of the bonding layer on the substrate, which is likely due to poor wetting of the braze material during forming. As illustrated the bonding layer 2801 has poor uniformity in thickness and variations in grit exposure. The combination of processing parameters, including the scan speed and the power, type, and size of the laser were insufficient to form an abrasive article having a uniform bonding layer 2801 and proper grit exposure and distribution of abrasive grains within the bonding layer 2803.

Particular Brazing Processes According to Another Aspect

Figure 24:
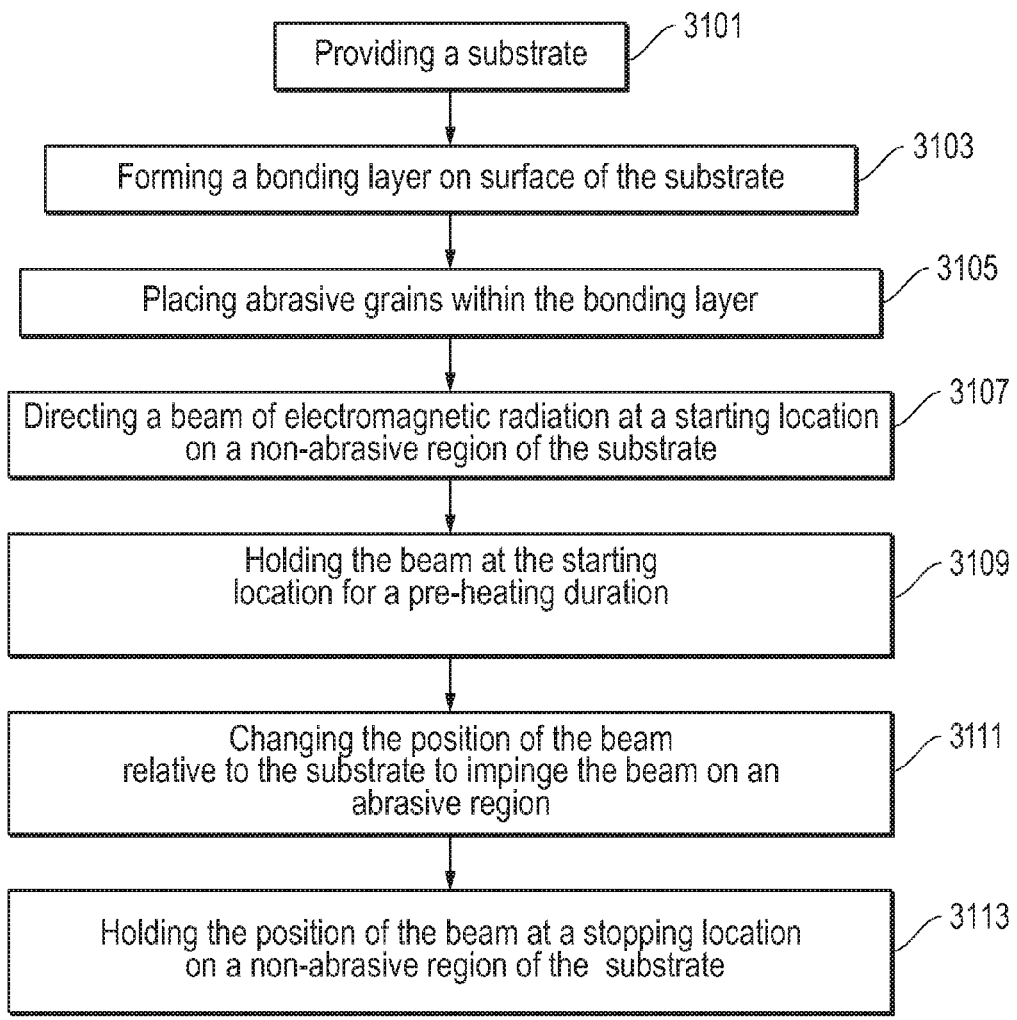
FIG. 24 includes a flowchart illustrating a process for forming a single-layered abrasive article using a particular brazing procedure in accordance with an embodiment.

FIG. 24 includes a flow chart illustrating another brazing process for forming a single-layered abrasive article in accordance with an embodiment. The process is initiated at step 3101 by providing a substrate. Generally, the substrate is a piece of material having a surface suitable for holding subsequently formed layers thereon, for example the bonding layer and layer of abrasive grains. The substrate can have certain shapes, such as a polygonal shape, including for example, a circular or rectangular shape. The substrate can include those materials noted in other embodiments herein.

The substrate can have a thickness suitable for supporting component layers thereon. For example, the average thickness of the substrate can be less than about 10 mm. In certain other embodiments, the average thickness can be less, such as not greater than about 8 mm, not greater than about 5 mm, or not greater than about 2 mm. Embodiments herein utilize substrates having an average thickness within a range between about 0.5 mm and about 10 mm. In certain instances, the substrate may be flexible metal material. In such instances, the average thickness can be less than about 2 mm. More particularly, flexible substrates have an average thickness within a range between about 0.5 mm and about 2 mm.

After providing the substrate at step 3101, the process continues at step 3103 by forming a bonding layer overlying a surface of the substrate. The bonding layer provides an interface for attaching abrasive grains to the substrate. Formation of the bonding layer can include processes as described in accordance with other embodiments. Moreover, the bonding layer can incorporate materials as described herein and have certain features, such as thickness, as described in accordance with other embodiments herein.

After forming the bonding layer on the surface of the substrate at step 2103, the process continues at step 2105 by placing a single layer of abrasive grains within the bonding layer. The process of placing a single layer of abrasive grains can include those processes described herein in accordance with other embodiments. The abrasive grains can include abrasive materials or superabrasive materials, and have average grit sizes as described herein. Moreover, unlike other forming methods, the present method utilizes distinct steps for the application of the bonding layer and the application of abrasive grains, as opposed to forming a mixture combining the bonding material and abrasive grains and then a single application of the mixture to a surface. This allows the select placement of the abrasive grains within the bonding layer as well as suitable formation of a single-layered abrasive article.

After placing a single layer of abrasive grains within the bonding layer at step 2105, the process continues at step 2107 by directing a beam of electromagnetic radiation at a starting location on the substrate containing the bonding layer and abrasive grains. During processing the beam will be directed over the region of the substrate including the bonding layer and the abrasive grains and the energy supplied by the beam is sufficient cause brazing of the bonding layer, thereby attaching the abrasive grains to the substrate. In accordance with an embodiment, the beam of electromagnetic radiation is generated by a laser device. According to one particular embodiment, the laser device is a fiber laser, for example a single-mode or multi-mode fiber laser commonly available from IPG Photonics Corporation as YLR HP Series.

The brazing process can be conducted with a beam having a specific power. Notably, the beams disclosed herein are particularly low-powered beams, having a power of not greater than about 800 W. In certain embodiments, the beam can use less power, such as not greater about 600 W, not greater than about 400 W, not greater than about 300 W, or even not greater than about 200 W. In accordance with a particular embodiment, the beam has a power within a range between 50 W and 800 W, and more particularly within a range about 100 W and 400 W. It will be appreciated that reference herein to the power of the beam will be understood to refer to the power at which the beam is operating.

Generally, the wavelengths of the beams of electromagnetic energy used to conduct the brazing operation are particularly suited with respect to the absorptivity of the materials of the bonding layer. As such, the wavelength of the beam of electromagnetic energy is generally not greater than about 20 microns. In other instances, the wavelength of the beam of electromagnetic radiation is less, such as not greater than about 15 microns, not greater than about 12 microns, not greater than about 10 microns, not greater than about 8 microns, or even not greater than about 5 microns. Particular embodiments use a wavelength for the beam of electromagnetic radiation within a range between about 0.01 microns and about 20 microns, such as between about 0.01 microns and about 10 microns, or even between about 0.1 microns and about 5 microns.

Figure 25:
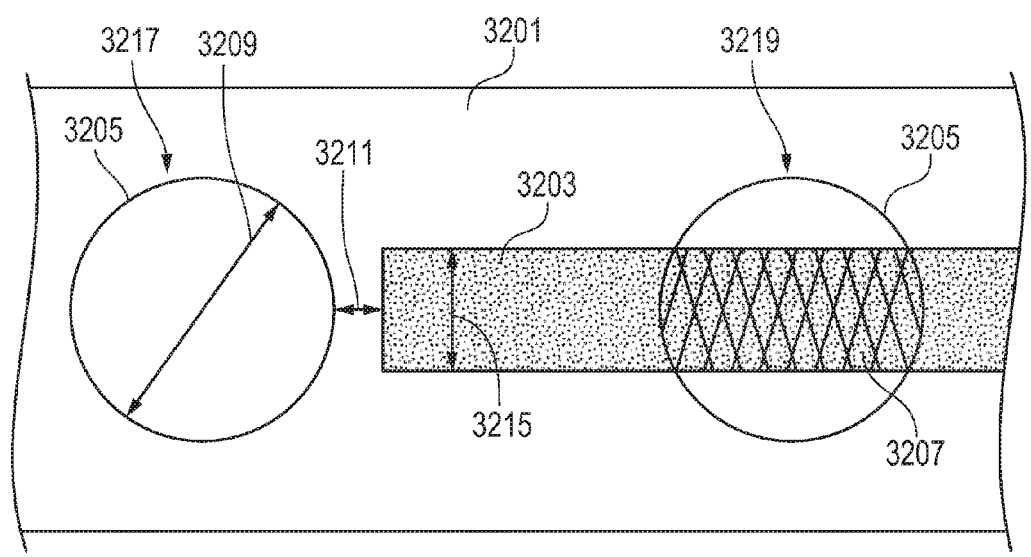
FIG. 25 includes a top view illustration of a single-layered abrasive article during a brazing process in accordance with an embodiment.

Referring briefly to FIG. 25, other characteristics of the beam of electromagnetic radiation are illustrated. FIG. 25 includes a top view of a portion of a single-layered abrasive article during a brazing process having an impinging beam of electromagnetic radiation thereon. In particular, FIG. 25 includes an illustration of a portion of a single-layered abrasive preform 3201 having an abrasive region 3203 including the bonding layer and abrasive grains.

As illustrated, the area on the abrasive preform 3201 effected by the beam of electromagnetic radiation is defined by a radiation zone 3205 having a circular shape. In accordance with a particular embodiment, the radiation zone has a diameter 3209 of at least about 2 mm. In other embodiments, the diameter 3209 is greater, such as at least about 3 mm, or even at least about 5 mm. Certain embodiments utilize a beam having a diameter 3209 within a range between about 2 mm and about 5 mm. In certain alternative embodiments, the beam can have a rectangular shape.

The radiation zone 3205 has a substantially uniform energy distribution, such that the amount of energy generated by the beam across the diameter 3209 of the radiation zone 3205 is substantially constant, that is, a non-Gaussian distribution as opposed to lasers having a Gaussian distribution of light energy away from a focal point at the center of the radiation zone. The uniform energy distribution within the radiation zone 3205 facilitates uniform heating of the bonding layer and thus the formation of a single-layered abrasive having a uniform and homogeneous braze material.

As further illustrated in FIG. 25, the beam of electromagnetic radiation is incident upon a non-abrasive region 3217 of the abrasive preform 3201. That is, a non-abrasive region 3217 containing the substrate material that is separate and spaced apart from the abrasive region 3203 containing the bonding layer and abrasive grains. In fact, according to one embodiment, the step of directing a beam at a starting location includes directing the beam at a non-abrasive region 3217 illustrated in FIG. 25. In such embodiments, the entire area of the radiation zone 3205 is initially impinging upon the substrate, and is not impinging upon the bonding layer or abrasive grains.

In particular embodiments, the beam can be directed such that the radiation zone 3205 is separate and spaced apart from the abrasive region 3203 by a distance 33211 measured from the closest edge of the beam to the closest edge of the abrasive region 3203. Particular distances 3211 can be utilized such that the substrate is heated and the abrasive region 3203 is suitably pre-heated before the beam impinges directly upon the abrasive region 3203. According to one embodiment, the distance 3211 is less than the diameter 3209 of the radiation zone 3205. In other embodiments, the beam can be placed in closer proximity to the abrasive region 3203, such that the distance 3211 is less than a radius of the radiation zone 3205. In particular instances, the distance 3211 can be less than about 1 mm, such as less than about 0.5 mm. Particular embodiments utilize a distance within a range between about 0.1 mm and about 2 mm, and more particularly within a range between about 0.25 mm and about 1 mm.

Referring again to FIG. 24, after directing a beam at the starting location at step 3107, the process continues at step 3109 by holding the beam at the starting location for a pre-heating duration 3109. Holding the beam at the starting location facilitates delivering energy to the substrate and enable a suitable brazing operation. Generally, the beam can be held at the starting location for a pre-heating duration not greater than about 10 seconds. In certain other embodiments, the pre-heating duration can be less, such as not greater than about 8 seconds, not greater than about 5 seconds, or even not greater than about 2 seconds. Certain embodiments utilize a pre-heating duration within a range between about 0.5 seconds and about 10 seconds, and more particularly within a range between about 0.5 seconds and about 5 seconds.

After holding the beam at the starting location at step 3109, the process continues by changing the position of the beam relative to the substrate to impinge the beam on an abrasive region at step 3111. Directing the beam at the abrasive region facilitates the brazing process. In certain embodiments, changing the position of the beam relative to the substrate can be accomplished by moving the substrate and holding the beam in a stationary position. In other embodiments, the beam can be moved while the substrate is held in a stationary position. In still other embodiments, the beam and the substrate can both be moved relative to each other, for example, in the same direction or even in opposite directions to each other.

In any of the above such cases, the position of the beam is changed relative to the substrate such that the radiation zone is scanned across the abrasive region to effect brazing of the bonding layer. According to one embodiment, scanning can be conducted at a constant rate such that all portions of the abrasive region receive substantially the same amount of energy from the beam to create a uniform braze. In accordance with certain embodiments, the scanning rate can be particularly slow, such as not greater than about 5 mm/second. In other embodiments, it may be less, such as not greater than about 4 mm/second, 2 mm/second, or even not greater than 1 mm/second. In particular embodiments, the scanning rate is within a range between about 0.25 mm/second and about 5 mm/second, and more particularly within a range between about 0.5 mm/second and about 2 mm/second.

Referring again to FIG. 25, the beam is illustrated as being directed at a scanning location 3219 and impinging upon the abrasive region 3203. In particular, the beam is incident upon the abrasive region 3203 and defines an impingement area 3207 as the area within the abrasive region 3203 affected by the radiation zone 3205.

The energy density of the beam within the impingement area 3207 is substantially uniform as previously described and has an energy sufficient to effect brazing. According to one embodiment, the energy density of the beam within the impingement area 3207 is at least about 30 J/mm$^2$. It will be appreciated that too great an energy supplied within the impingement area 3204 may result in fracture of the abrasive grains and poor bonding behavior as a result of rapid changes in the temperature. As such, in certain embodiments, the energy density within the impingement area 3204 is within a range between about 30 J/mm$^2$ and 100 J/mm$^2$, and more particularly within a range between about 40 J/mm$^2$ and about 70 J/mm$^2$.

Additionally, the energy distribution within the impingement area 3207 is particularly uniform, such that the change in the energy across the width 3215 of the abrasive region within the impingement area 3207 is not greater than about 10% of the total energy of beam. In other embodiments, the change in energy may be less, such as not greater than about 8%, not greater than about 5%, or even not greater than about 2%.

As further illustrated in FIG. 25, the radiation zone 3205 has an area greater than the area of the impingement area 3207, such that after passing over a portion of the abrasive region 3203, the beam has impinged upon a full width 3215 of the abrasive region 3203. In accordance with a particular embodiment, the width 3215 of the abrasive region 3203 and the diameter 3209 of the radiation zone 3205 may have particularly selected dimensions to effect suitable brazing. For example, the width 3215 is generally not greater than about 60% of the diameter 3209 of the radiation zone 3205. In other embodiments, the width 3215 can be less, such as not greater than about 50% of the diameter, not greater than about 40%, or even not greater than about 25%. Particular embodiments utilize a width 3215 within a range between about 25% and about 50% of the diameter 3209 of the radiation zone 3205.

The dimensions of the radiation zone 3205 can cover a certain area within the impingement area 3207. In accordance with certain embodiments, the radiation zone 3205 has an area that is greater than the impingement area 3207 by at least about 5%. In other embodiments, the radiation zone 3203 has an area that is at least about 20% greater, such as at least about 30% greater, or even at least about 60% greater than the impingement area 3207. Particular embodiments utilize a radiation zone 3205 having an area within a range between about 5% and about 60% greater than the impingement area 3207.

Referring again to FIG. 24, after changing the position of the beam at step 3111, the process continues at step 3113 by holding the position of the beam at a stopping location on a non-abrasive region of the substrate. As such, embodiments herein utilize a technique wherein the radiation zone of the beam is directed initially at a non-abrasive region prior to scanning over the abrasive region, and after completing the scan over the abrasive region, the beam is stopped on a non-abrasive region, otherwise a region without the bonding material and abrasive grains.

Figure 26:
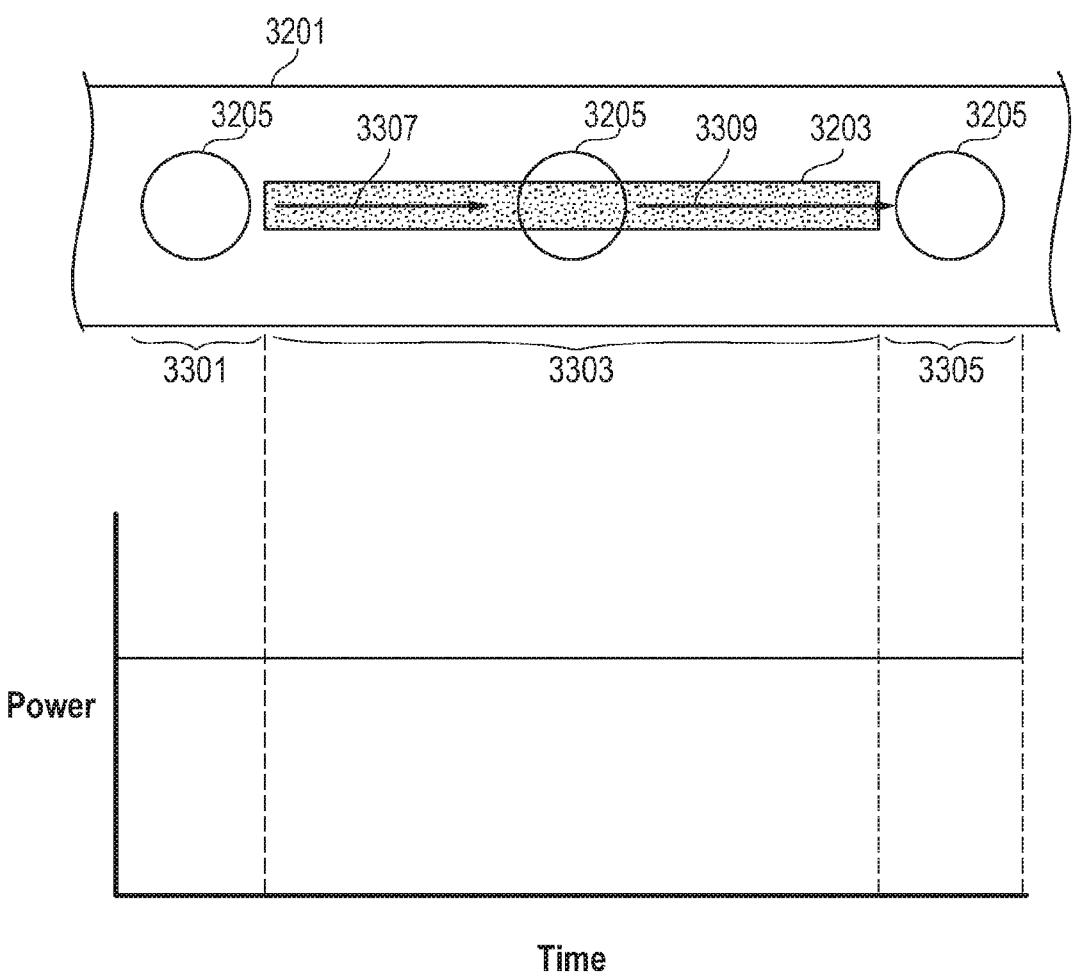
FIG. 26 includes a top view of a single-layered abrasive article during a brazing process and an accompanying plot illustrating the power versus time of the beam of electromagnetic radiation during the brazing process in accordance with an embodiment.

FIG. 26 provides an illustration of such a procedure. In particular, FIG. 26 includes a top view of a single-layered abrasive article during a brazing process and an accompanying plot illustrating the power versus time of the beam of electromagnetic radiation during the brazing process in accordance with an embodiment. As illustrated, the single-layered abrasive article includes a portion of an abrasive preform 3201 having an abrasive region 3203 including the bonding layer and a layer of abrasive grains contained therein. In particular, the view of the abrasive article includes an illustration of a beam defined by the radiation zone 3205 directed at different portions of the abrasive preform 3201 during a brazing procedure.

Initially, the beam is impinging upon a non-abrasive region (i.e., a region absent abrasive grains and a bonding layer) at a starting location within region 3301, and upon initiation of a scanning procedure, the position of the beam is changed along path 3309 such that the beam impinges upon the abrasive region 3203. After scanning the beam across the entire length of the abrasive region 3203, the position of the beam can be held at a stopping location within region 3305, which includes a non-abrasive region of the abrasive preform 3201. Notably, at the stopping location, the beam is separate and spaced apart from the abrasive region 3203. The beam can be spaced apart from the abrasive region 3203 at a distance such as the distance 3211 described herein. According to one embodiment, at the stopping location, the beam impinges directly and entirely upon the substrate.

In further reference to FIG. 26, a plot of power versus time accompanies the illustration demonstrating the power used during the brazing procedure in accordance with one embodiment. As illustrated, the beam has a constant power throughout the brazing procedure. That is, the power used is the same at the starting location during the pre-heating duration, and through the scanning operation within region 3303, and through to the stopping location within region 3305. Notably, the use of constant power is particularly suitable in the context of low power beams as disclosed herein.

Figure 27:
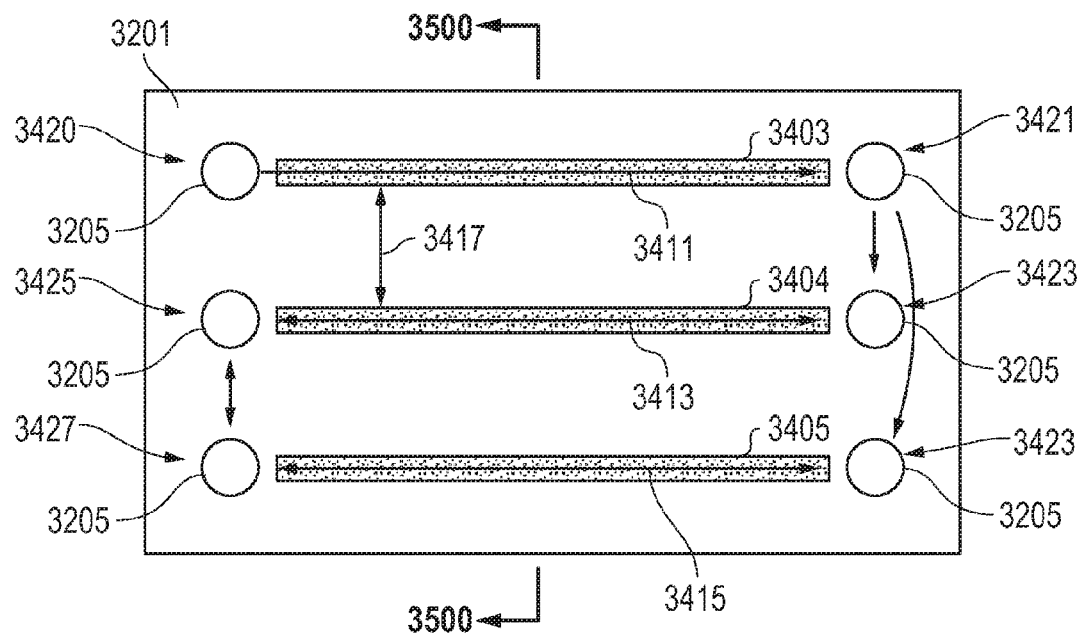
FIG. 27 includes a top view of a portion of a single-layered abrasive article in accordance with an embodiment.

FIG. 27 includes a top view of a portion of a single-layered abrasive article in accordance with an embodiment. In particular, FIG. 27 includes an abrasive preform 3201 including a substrate and a series of abrasive regions 33403, 3404 and 3405 (3403-3405) overlying the substrate and aligned such that the longitudinal axes of the abrasive regions 3403-3405 are parallel to each other. Additionally, FIG. 27 illustrates the positioning of the beam and a brazing path 3411 for conducting a brazing operation of the abrasive regions 3403-3405. As illustrated, the radiation zone 3205 can be initially directed at a starting location 3420, and after a sufficient pre-heating duration, the beam can be directed along the path 3411 to location 3421. After reaching location 3421, according to one embodiment, the beam can be moved to an adjacent location 3423, held for a pre-heating duration and moved along path 3413 to location 3425 to braze the abrasive region 23404. After which, the beam can again be moved to location 3427, held for a pre-heating duration and moved along path 3415 to effect brazing of the abrasive region 3405. After brazing the abrasive region 3405 the beam can be held at location 3423.

According to an alternative embodiment, after moving the beam over the abrasive region 3403, the beam can be moved to location 3423, held for a pre-heating duration, and moved across the abrasive region 3405 along path 3415 to location 3427. After which, the beam can be moved to location 3425, held for a pre-heating duration and moved along the path 3413 to location 3423 effect brazing of the abrasive region 3404. In the alternative embodiment, the abrasive region 3404 is skipped after brazing the abrasive region 3403 to allow cooling of the substrate and region surrounding the abrasive region 3403 to avoid damage to the abrasive region 3403 based on excessive thermal treatment.

As illustrated in FIG. 27, the abrasive regions 3403-3405 may be laterally spaced apart by a distance 3417 that is sufficient to avoid thermal damage to directly adjacent abrasive regions during the brazing process. As such, according to one embodiment, the distance 3417 is at least about half of the width 3215 of the abrasive regions 3403-3405. In other embodiments, the distance 3417 is greater, such as at least equal to the width 3215, at least 150% of the width 3215, or even at least 200% of the width 3215. Particular embodiments utilize a distance 3417 within a range between about half of the width 3215 and about 150% of the width. It will be appreciated that in other arrangements, the abrasive regions 3403-3405 may not have the illustrated coaxial arrangement and as such, the distance 3417 is considered the smallest distance between directly adjacent abrasive regions.

Figure 28:
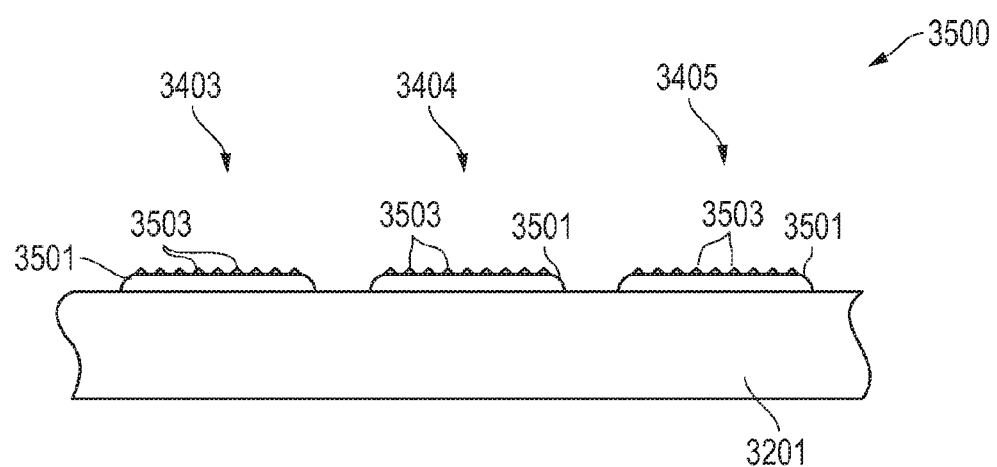
FIG. 28 includes a cross-sectional illustration of the portion of the single-layered abrasive article of FIG. 27 in accordance with an embodiment.

FIG. 28 includes a cross-sectional illustration of the portion of the single-layered abrasive article of FIG. 27 in accordance with an embodiment. In particular, the single-layered abrasive article 3500 includes the abrasive regions 3403-3405 having the bonding layer 3501 and abrasive grains 3503 that are adjacent to each other and in direct contact with the major surface of the substrate 3201. In accordance with a particular embodiment, the abrasive region 3403-3405 are overlying a substrate 3201 having a flat surface, that is the spaces between the abrasive regions 3403-3405 do not include channels or other formations within the substrate 3201. The use of a low powered beam in combination with the methods disclosed herein facilitates the formation of the abrasive article 3500, but does not preclude other arrangements.

Various types of abrasive articles can be formed, including but not limited to, the single-layered abrasive tools and their corresponding features as illustrated in FIGS. 3C-3H as described herein.

Figure 29A:
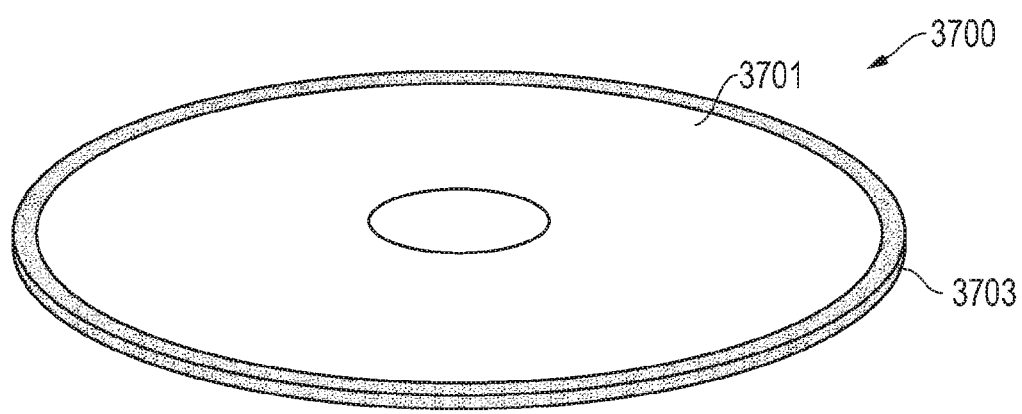
FIG. 29A includes an illustrations of an abrasive tools incorporating a single-layered abrasive article in accordance with an alternative embodiment.

FIG. 29A includes a perspective view illustration of a single-layered abrasive article in accordance with an embodiment. In particular, the single-layered abrasive article 3700 includes a substrate 3701 having a disk shape and an abrasive region 3703 overlying the edge of the substrate 3701 between the major surfaces and also overlying a portion of the major surfaces abutting the edge. Unlike previously illustrated embodiments, the abrasive region 3703 may not necessarily be separated by non-abrasive regions. The single-layered abrasive article 3700 may be suitable for use in grinding, and may be particularly useful in cutting applications.

Figure 29B:
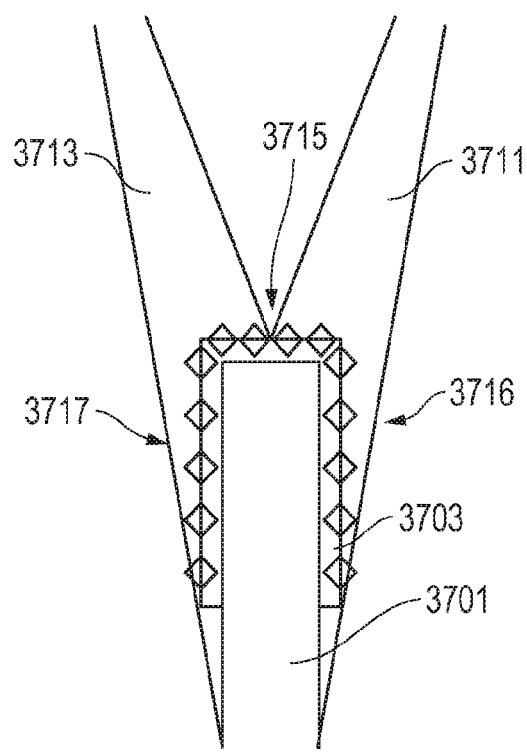
FIG. 29B includes an illustration of a portion of the abrasive tool of FIG. 29A and a method of forming the tool according to an alternative embodiment.

Notably, the single-layered abrasive article 3700 may be formed according to a unique process. FIG. 29B includes an illustration of a portion of the abrasive tool of FIG. 29A and a method of forming the tool according to an alternative embodiment. The substrate 3701 and abrasive region 3703 can include those features as described herein. Notably, the forming process may utilize more than one beam of electromagnetic radiation directed at the abrasive region 3703 during forming as the abrasive region 3703 has portions that extend in multiple planes. As illustrated in FIG. 29B, the brazing process can use two beams 3711 and 3713 of radiation directed at different portions of the abrasive region 3703. In particular, the beams 3711 and 3713 may be oriented with respect to each other such that they are directed primarily at the abrasive regions 3703 at the major surfaces 3716 and 3717 of the substrate 3701, and further the beams 3711 and 3713 may converge or overlap on the abrasive region 3703 disposed on the edge surface 3715 of the substrate 3701.

However, the present application is directed to unique processes and articles facilitating the formation of brazed, single-layered abrasive articles using a beam of electromagnetic energy. In particular, the foregoing discloses a particular combination of characteristics and processes such as utilization of certain types of beams of electromagnetic radiation (e.g., beams having particular sizes, shapes, power, energy density, and energy uniformity), scanning speeds, and specific methodologies depending upon the shape of the single-layered abrasive to be formed. The result is single-layered abrasive articles having distinct characteristics and properties, including for example improved bond strength, improved homogeneity and uniformity of the bonding layer, improved grit exposure, and improved wetting of the bonding layer with the abrasive grains.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The invention claimed is:

1. A method of forming an abrasive article comprising:
    directing a beam of electromagnetic radiation at a starting location on an abrasive preform comprising a bonding layer and abrasive grains within the bonding layer;
    increasing the power of the beam of electromagnetic radiation to a scanning power while directed at the starting location; and
    changing a position of the beam relative to the abrasive preform from the starting location to a second location on the abrasive preform at a brazing rate to form a brazed abrasive region on the substrate, wherein the beam is incident upon the bonding layer and abrasive grains defining an impingement area, and the energy density of the beam within the impingement area is at least about 10 J/mm$^2$ and wherein a maximum brazing area rate $Vr_{max}$ (mm$^2$/s) is dependent upon the heat flux rate (qr) of the beam of electromagnetic radiation and the absorptivity ($\alpha$) of the bonding layer material relative to a wavelength of the electromagnetic radiation and the maximum brazing area rate, $Vr_{max}$ (mm$^2$/s) is not greater than a value based on the formula, $Vr_{max}=0.0009(qr)^2-0.06(qr)+1.5$ for a heat flux rate (qr) of at least about 40 W/mm.

2. The method of claim 1, wherein the bonding layer comprises a metal selected from the group of metals consisting of nickel, chromium, tin, copper, titanium, molybdenum, and aluminum.

3. The method of claim 1, wherein the beam of electromagnetic radiation is generated by a laser device.

4. The method of claim 3, wherein the laser device is a laser diode.

5. The method of claim 1, wherein the beam of electromagnetic radiation has a power of at least about 800 W.

6. The method of claim 1, wherein the beam of electromagnetic radiation defines a radiation zone having a rectangular shape.

7. The method of claim 6, wherein the beam of electromagnetic radiation has a substantially uniform energy distribution across the radiation zone.

8. The method of claim 7, wherein the beam of electromagnetic radiation has an energy distribution having a change in energy across the length of the impingement area of not greater than about 10%.

9. The method of claim 1, wherein changing the position of the beam includes scanning the beam across the region at a constant scanning rate of at least about 1 mm/sec.

10. The method of any one of claim 1, wherein the beam of electromagnetic radiation is operated in a continuous wave mode.

11. The method of claim 1, wherein the bonding layer comprises metal grains contained within a binder.

12. The method of claim 11, wherein the metal grains have an average grain size of not greater than about 30 microns.

13. The method of claim 1, wherein the bonding layer comprises a porosity within the binder of at least about 20 vol %.

14. The method of claim 1, wherein the substrate comprises a metal.

15. The method of claim 1, wherein the substrate comprises a metal selected from the group of metals consisting of aluminum, iron, nickel, molybdenum, copper, chromium, and a combination thereof.

16. The method of claim 1, wherein the abrasive grains comprise a material selected from the group of materials consisting of carbides, nitride, oxides, and borides.

17. The method of claim 16, wherein the abrasive grains are selected from the group of materials consisting of alumina, silicon carbide, cubic boron nitride, and diamond.

18. The method of claim 1, wherein the substrate comprises raised portions defining upper major surfaces extending above a lower major surface, and wherein the raised portions are separated by channels.

19. The method of claim 1, wherein changing the position of the beam of electromagnetic radiation relative to the abrasive region from a first location to a second location is completed along an arcuate path.

* * * * *